United States Patent
Beerel et al.

(10) Patent No.: US 9,558,309 B2
(45) Date of Patent: Jan. 31, 2017

(54) TIMING VIOLATION RESILIENT ASYNCHRONOUS TEMPLATE

(71) Applicants: Peter A. Beerel, Encino, CA (US); Melvin Breuer, Encino, CA (US); Benmao Cheng, Qingdao (CN); Dylan Hand, Bronx, NY (US)

(72) Inventors: Peter A. Beerel, Encino, CA (US); Melvin Breuer, Encino, CA (US); Benmao Cheng, Qingdao (CN); Dylan Hand, Bronx, NY (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 14/702,426

(22) Filed: May 1, 2015

(65) Prior Publication Data

US 2015/0326210 A1 Nov. 12, 2015

Related U.S. Application Data

(60) Provisional application No. 61/991,219, filed on May 9, 2014.

(51) Int. Cl.
- *H03K 19/00* (2006.01)
- *G06F 17/50* (2006.01)
- *H03K 3/037* (2006.01)
- *H03K 19/003* (2006.01)
- *H03K 19/096* (2006.01)

(52) U.S. Cl.
CPC ......... *G06F 17/505* (2013.01); *G06F 17/5059* (2013.01); *H03K 3/037* (2013.01); *H03K 3/0375* (2013.01); *H03K 19/003* (2013.01); *H03K 19/00323* (2013.01); *H03K 19/0966* (2013.01); *G06F 17/5031* (2013.01); *G06F 2217/62* (2013.01); *G06F 2217/84* (2013.01)

(58) Field of Classification Search
CPC ...... G06F 17/50; G06F 17/505; H03K 19/003; H03K 19/00323; H03K 19/0966; H03K 3/037; H03K 3/0375
USPC .......................... 326/94, 93, 16, 14; 711/169
See application file for complete search history.

(56) References Cited

U.S. PATENT DOCUMENTS

| 5,841,482 A | 11/1998 | Wang et al. |
| 6,369,614 B1 * | 4/2002 | Ridgway ............... G06F 9/3869 326/93 |

(Continued)

OTHER PUBLICATIONS

United States International Searching Authority (ISA/US). 2015. International Search Report and Written Opinion, mailed Sep. 17, 2015, for PCT Application PCT/US2015/029047, entitled "Timing Violation Resilient Asynchronous Template" (counterpart PCT application to the instant United States application), Beerel et al. inventors.

(Continued)

*Primary Examiner* — Daniel D Chang
(74) *Attorney, Agent, or Firm* — McDermott Will & Emery LLP

(57) ABSTRACT

An asynchronous circuit may include a single-rail logic datapath; one or more error-detecting latches; a controller that controls the error-detecting latches; and delay lines. The controller and the delay lines may cooperate to communicate with one or more other controllers that the output of the controlled error-detecting latches may be valid prior to when the error-detecting latches indicate whether or not an error occurred.

11 Claims, 12 Drawing Sheets

(56) References Cited

U.S. PATENT DOCUMENTS

| | | | |
|---|---|---|---|
| 6,590,424 B2* | 7/2003 | Singh | G06F 7/00 |
| | | | 326/21 |
| 6,867,620 B2* | 3/2005 | Singh | G06F 9/3871 |
| | | | 326/112 |
| 6,946,869 B2* | 9/2005 | Jacobson | H03K 19/0016 |
| | | | 326/33 |
| 7,408,393 B1 | 8/2008 | Jain et al. | |
| 7,701,254 B2* | 4/2010 | Chow | H03K 19/1733 |
| | | | 326/46 |
| 8,188,765 B2* | 5/2012 | Ouellette | G06F 5/10 |
| | | | 326/112 |
| 2009/0108900 A1 | 4/2009 | Sotiriou et al. | |
| 2010/0322365 A1 | 12/2010 | Dobkin et al. | |
| 2011/0029941 A1 | 2/2011 | Dimou et al. | |
| 2011/0102017 A1 | 5/2011 | Lewis et al. | |
| 2013/0169360 A1 | 7/2013 | Gupta et al. | |
| 2014/0070849 A1 | 3/2014 | Feist et al. | |

* cited by examiner

TIMING VIOLATION RESILIENT ASYNCHRONOUS TEMPLATE

CROSS-REFERENCE TO RELATED APPLICATION

This application is based upon and claims priority to U.S. provisional patent application 61/991,219, entitled "BLADE: A TIMING VIOLATION RESILIENT ASYNCHRONOUS DESIGN TEMPLATE," filed May 9, 2014. The entire content of this application is incorporated herein by reference.

BACKGROUND

Technical Field

This disclosure relates to asynchronous circuits and to their design.

Description of Related Art

Traditional synchronous designs may incorporate timing margin to ensure correct operation under worst-case delays caused by process, voltage, and temperature (PVT) variations as well as data-dependency, K. Bowman, J. Tschanz, N. S. Kim, J. Lee, C. Wilkerson, S. Lu, T. Karnik, and V. De, "*Energy-Efficient and Metastability-Iimmune Resilient Circuits for Dynamic Variation Tolerance*," IEEE JSCC, vol. 44, no. 1, pp. 49-63, January 2009. Both synchronous and asynchronous designs have been proposed to address this problem.

--Asynchronous Solutions

Different asynchronous templates have been proposed to address increased variation in delay (e.g., A. Yakovlev, P. Vivet, and M. Renaudin, "*Advances in Asynchronous Logic: From Principles to GALS & NoC, Recent Industry Applications, and Commercial CAD Tools*," in *DATE*, March 2013, pp. 1715-1724). Quasi-delay-insensitive (QDI) templates may use completion signal logic, which may make them robust to delay variations at the cost of increased area and high switching activity due to a return to zero paradigm, P. Beerel, R. Ozdag, and M. Ferreti, *A Designer's Guide to Asynchronous VLSI*. plus 0.5 em minus 0.4 emCambridge University Press, 2010. Bundled-data templates (e.g., micropipelines, I. E. Sutherland, "Micropipelines," *Commun. ACM*, vol. 32, no. 6, pp. 720-738, June 1989) may use delay lines matched to single-rail combinational logic, providing a low area, low switching activity asynchronous solution (e.g., J. Cortadella, A. Kondratyev, L. Lavagno, and C. Sotiriou, "Desynchronization: Synthesis of asynchronous circuits from synchronous specifications," *IEEE Trans. on CAD*, vol. 25, no. 10, pp. 1904-1921, October 2006). However, the delay lines may need to be implemented with sufficiently large margins in the presence of on-chip variations, reducing the advantages of this approach. Researchers have proposed different solutions to mitigate these margins, such as duplicating the bundled-data delay lines. I. J. Chang, S. P. Park, and K. Roy, "*Exploring Asynchronous Design Techniques for Process-tolerant and Energy-Efficient Subthreshold Operation*," *IEEE JSSC*, vol. 45, no. 2, pp. 401-410, February 2010, constraining the design to regular structures such as PLAs, N. Jayakuma, R. Garg, B. Gamache, and S. Khatri, "*A PLA Based Asynchronous Micropipelining Approach for Subthreshold Circuit Design*," in DAC, 2006, pp. 419-424, and using soft latches, J. Liu, S. Nowick, and M. Seok, "*Soft Mousetrap: A Bundled-Data Asynchronous Pipeline Scheme Tolerant to Random Variations at Ultra-Low Supply Voltages*," in ASYNC, May 2013, pp. 1-7.

--Razor I, II, and Lite

As low-power designs become more prominent, dynamic voltage scaling has gained popularity to reduce energy consumption in synchronous circuits. However, increased margins due to variability in gate delays at low voltages can be a major concern with this approach. Razor-type architectures aim to alleviate the performance impact due to these increased margins by adding error detection and correction circuits to the design, D. Ernst, N. S. Kim, S. Das, S. Pant, R. Rao, T. Pham, C. Ziesler, D. Blaauw, T. Austin, K. Flautner, and T. Mudge, "*Razor: A Low-Power Pipeline Based on Circuit-Level Timing Speculation*," in *Microarchitecture*, 2003. MICRO-36. Proceedings. 36th Annual IEEE/ACM International Symposium on, December 2003, pp. 7-18. The original Razor design utilizes a "Razor flip-flop", which consists of a main flop connected to an early clock and a second latch connected to a late clock. Subsequently, the input data is double-sample by the two different clocks and the values of both the main flop and secondary latch are compared to determine if an error occurred. When an error is detected, the "good" value that was sampled later is re-latched into the main flop, which is then passed back into the datapath. At the system-level, a pipeline controller may stall or flush instructions in previous stages to prevent data contamination. This operation may require tight integration into the original design to ensure that instructions can be reliably stopped, flushed, and replayed without impacting overall data integrity. In this design, the performance penalty is theoretically limited to one cycle; however, in practice the implementation of the Razor correction circuits in high-speed designs can be a bottleneck, leading to poor performance overall.

RazorII was proposed to solve some of the shortcomings of the original Razor design, S. Das, C. Tokunaga, S. Pant, W.-H. Ma, S. Kalaiselvan, K. Lai, D. Bull, and D. Blaauw, "*RazorII: In situ Error Detection and Correction for PVT and SER Tolerance*," *IEEE JSCC*, vol. 44, no. 1, pp. 32-48, January 2009. In particular, it utilizes even more tightly integrated architectural-level changes for error correction, forgoes the flop and latch configuration in favor of a single latch plus a transition detector, and moves the possible point of metastability from the datapath to the control path. The RazorII flop's primary storage mechanism is a latch, which removes the possibility of metastability occurring on the rising edge of clock. It also "corrects" its output without re-latching as the latch remains transparent for the entire high phase of the clock. During this time, the transition detector monitors the input data and will generate a flag signal when a transition occurs, indicating a timing error. This error signal can subsequently become metastable, as the input data and falling edge of clock can arrive simultaneously. The designers use a standard two-flop synchronizer in an attempt to resolve metastability before it enters the control circuit; however, this may not be a reliable method, as it only accounts for cases when metastability resolves fairly quickly (i.e. within a single cycle). Additionally, it enforces a one-cycle delay on error detection, which may further complicate the correction algorithm and circuitry. Unlike the original Razor, multiple pipeline stages may need to be flushed and the instruction may need to be replayed multiple times, occasionally at half the original system clock rate, until the error is resolved, potentially limiting the potential benefits of the RazorII system. Hold times can also be problematic, as the combinational logic delay between stages may need to be at least as long as the high phase of the clock to ensure new data does not race through the latch-based design.

More recently, Razor Lite has attempted to address the overhead and hold time issues of RazorII by integrating the transition detection more directly into a typical flop-flop design and reducing the timing detection window by reducing the duty cycle of the clock, S. Kim, I. Kwon, D. Fick, M. Kim, Y.-P. Chen, and D. Sylvester, "*Razor-lite: A side-channel error-detection register for timing-margin recovery in 45 nm soi cmos*," in *Solid-State Circuits Conference Digest of Technical Papers (ISSCC), 2013 IEEE International*, February 2013, pp. 264-265. However, it may still require tight architectural integration for the replay and correction mechanism, may suffer from metastability, and may incur high performance penalties when an error occurs.

--Timber

TIMBER is similar to Razor-II in that it primarily uses latches to avoid metastability in the datapath, M. Choudhury, V. Chandra, K. Mohanram, and R. Aitken, "*Timber: Time Borrowing and Error Relaying for Online Timing Error Resilience*," in *DATE*, March 2010, pp. 1554-1559. However, the time-borrowing nature of latches is exploited to allow error correction across multiple stages. For example, an error occurring in stage 1 may be resolved as it propagates through non-critical paths in stage 2, thereby preventing an error from being flagged in stage 2. In the case when an error may extend across multiple stages, a global error detection circuit may temporarily slow the clock to until the error is resolved. However, this design may still requires architectural changes to adjust the clock frequency, which in many designs may not be scaled on a cycle-by-cycle bases as proposed. Additionally, the authors may be incorrectly assuming that using a latch-based datapath prevents metastability in the control path as well as the datapath. They may not filter or attempt to resolve metastability issues in their global control circuit, which can lead to low mean-time-between-failures (MTBF).

--Bubble Razor

Bubble Razor (BR) inherits the features of previous Razor techniques enabling real-time error detection and correction, M. Fojtik, D. Fick, Y. Kim, N. Pinckney, D. Harris, D. Blaauw, and D. Sylvester, "*Bubble Razor: Eliminating Timing Margins in an ARM cortex-M3 Processor in 45 nm CMOS Using Architecturally Independent Error Detection and Correction*," *IEEE JSCC*, vol. 48, no. 1, pp. 66-81, January 2013; M. Fojtik, D. Fick, Y. Kim, N. Pinckney, D. Harris, D. Blaauw, and D. Sylvester, "*Bubble Razor: An Architecture-Independent Approach to Timing-error Detection and Correction*," in *Solid-State Circuits Conference Digest of Technical Papers (ISSCC), 2012 IEEE International*, February 2012, pp. 488-490. Unlike other Razor architecture, it is based on a two-phase latch-based design, in which each traditional flip-flop is replaced with two latches that undergo retiming to have approximately equal amount of logic between each latch. It uses a bubble propagation algorithm that makes the approach applicable to any architecture and enables the automatic application of this technique to legacy flip-flop based RTL designs, significantly reducing barriers to adoption.

Bubble Razor flags a timing violation when the data arriving at a latch varies after the latch opens using an error detecting latch (EDL). Upon detecting a timing violation, the circuit may automatically recover by stalling the subsequent latch, giving it an additional clock cycle to process the data. Half of the additional clock cycle is used to compensate for the unexpectedly large delay from the previous latch and the other half accounts for the delay from the current latch to the subsequent one. Thus, timing violations may be corrected, as long as the real delay of each half clock-cycle step never exceeds one clock cycle of time. However, to ensure correct operation, stalling the subsequent latch may not be sufficient. Upstream stages may need to be stalled to ensure valid data is not overrun and downstream stages must be stalled to ensure corrupt data is not accidentally interpreted as valid.

The latch-based scheme in BR enables an automatic local stall propagation algorithm without modifying the original RTL design. Consider the 2-stage ring in FIG. 1(*a*) that has 4 latches with associated clock gating logic that implements the stall propagation algorithm. A timing violation may cause an error signal to be sent to its Right Neighbor (RN) to tell it to stall. Then, the stalling may spread both forward and backward directions around the ring in a wave-like pattern. For example, in FIG. 1, the timing violation occurs in latch 2 and this may trigger a stall in latch 3. The clock gating logic for latch 3 then spreads the stall forward to stage 4 and backward to latch 2. Clock gating logic that receives stalls from both directions terminates the spreading of stalls. This is called stall annihilation. For example, in FIG. 1(*b*), the stall is terminated by the clock gating logic of latch 1 because it receives stalls from both of its neighbors, i.e., latches 2 and 4.

Unlike other Razor schemes, one significant weakness of Bubble Razor may be that it does not consider the impact of metastability in the error detecting logic. As the shadow latch closes at a time when errors are expected to happen at some frequency, metastability at the output of the shadow latch may occur. The metastable state may propagate through the error detection logic (XOR followed by a dynamic OR gate). If this state persists for longer than half a clock cycle, it may be latched into the control logic resulting in a system failure. This oversight can significantly reduce the mean time before failure for many applications.

SUMMARY

An asynchronous circuit may include a single-rail logic datapath; one or more error-detecting latches; a controller that controls the error-detecting latches; and delay lines. The controller and the delay lines may cooperate to communicate with one or more other controllers that the output of the controlled error-detecting latches may be valid prior to when the error-detecting latches indicate whether or not an error occurred.

At least one of the delay lines may have a programmable delay amount.

One or more of the delay lines may control a nominal delay between when latches of different connected controllers become transparent. The controller, upon one or more error detecting latches determining an error occurred, may cooperate with the one or more delay lines to extend the nominal delay between when latches of different connected controllers become transparent.

The one or more of the delay lines may control a nominal time period during which the latches controlled by the controller are transparent.

The controller, upon one or more error detecting latches determining an error occurred, may cooperate with the one or more delay lines to extend the nominal time period during which the latches that are controlled by the controller are transparent.

The one or more delay lines may control: a nominal delay between when latches of different connected controllers become transparent; and a nominal time period during which the latches controlled by the controller are transparent.

The controller, upon one or more error detecting latches determining an error occurred, may cooperate with the one or more delay lines to extend: the nominal delay between when latches of different connected controllers become transparent; and the nominal time period during which the latches that are controlled by the controller are transparent.

The asynchronous circuit may include one or more components that prevent metastability at the output of the error-detecting latches from propagating to one or more other components of the circuit and generate a signal indicating that the metastability has been resolved. The controller may delay a communication with the one or more connected controllers until the metastability is resolved.

The asynchronous circuit may include one or more time borrowing latches. The controller may also control the one or more time borrowing latches.

Non-transitory, tangible, computer-readable media may contain a program of instructions that, when loaded and run in a computer system, causes the computer system to: receive a synchronous register transfer logic specification; synthesize a design for a synchronous circuit that contains flip-flops or latches; replace one or more of the flip-flops or latches within the design, each with one or more error-detecting latches; insert one or more asynchronous controllers and one or more delay lines into the design; and output the design after the replace and insert steps.

The programming instructions may cause the computer system to change the position of the one or more error-detecting latches after the instructions replaced one of the flip-flops or latches within the design.

The programming instructions may cause the computer system to cause a first number of flip-flops or latches to be designated for replacement with one or more error-detecting latches and, thereafter, designate a second number different than the first number for replacement with one or more error-detecting latches.

The determination of the second number may be performed by constraining the logic delay between error-detecting latches that trigger a fraction of total errors.

The programming instructions may cause the computer system to add one or more additional error-detecting latches to the design, in addition to the one or more error-detecting latches that replace the one or more flip-flops or latches.

The programming instructions may cause the computer system to place the additional error-detecting latches at inputs or outputs of sub-circuits of the design that cannot be made error-detecting.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 13A is a BDARC comparison of effective clock period with normally distributed delays; and FIG. 13B is a BDARC comparison of effective clock period with log-normally distributed delays.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 2:
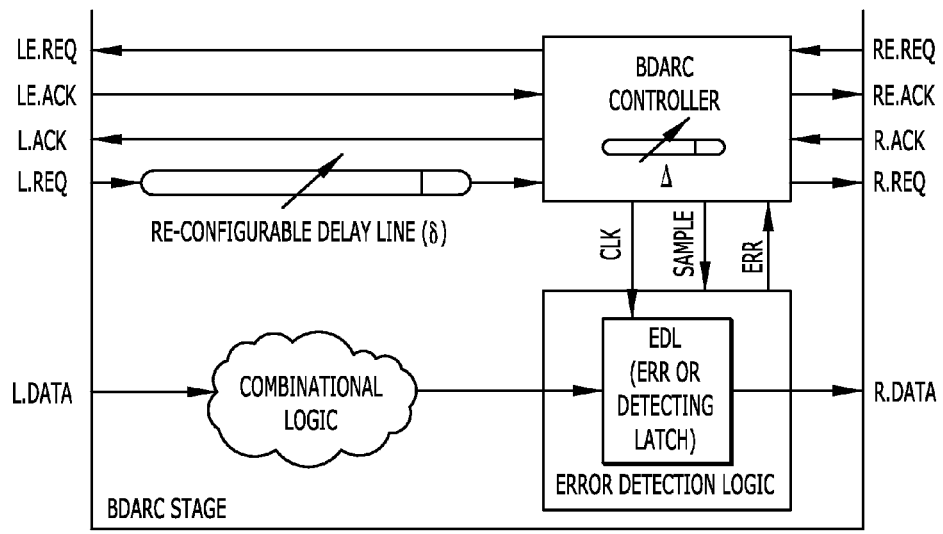
FIG. 2 illustrates an example of a template for a pipeline stage of a bundled-data asynchronous resilient circuits (BDARC) which may have a BDARC controller, two reconfigurable delay lines, single-rail combinational logic, and one or more error-detecting latches.

The bundled-data asynchronous resilient circuit (BDARC) template, an example of which is shown in FIG. 2, may use single-rail logic followed by error detecting latches (EDLs), reconfigurable delay lines, and an asynchronous controller. In this example, the first delay line is of duration δ and controls when the EDL becomes transparent, allowing the data to propagate through the latch. The BDARC controller may speculatively assume that the data at the input of the EDL is stable when it becomes transparent and thus sends an output request along the typical bundled data channel L/R. The second delay line, with duration Δ, defines the time window during which the EDL is transparent. If data changes during this window, but stabilizes before the latch becomes opaque, it may be recorded as a timing violation, which can subsequently be corrected. Consequently, Δ defines a timing resiliency window (TRW) after δ during which the speculative timing assumption may be safely violated.

In particular, if the combinational output transitions during the TRW, the error detection logic may flag a timing violation by asserting its Err signal, which is sampled by the controller. The BDARC controller may then communicate with its right neighbor using a speculative handshaking protocol implemented with an additional error channel (RE/LE) to recover from the timing violation by delaying the opening of the next stage's latch, as will be described in more detail below.

--Error Detection Logic

Figure 3:
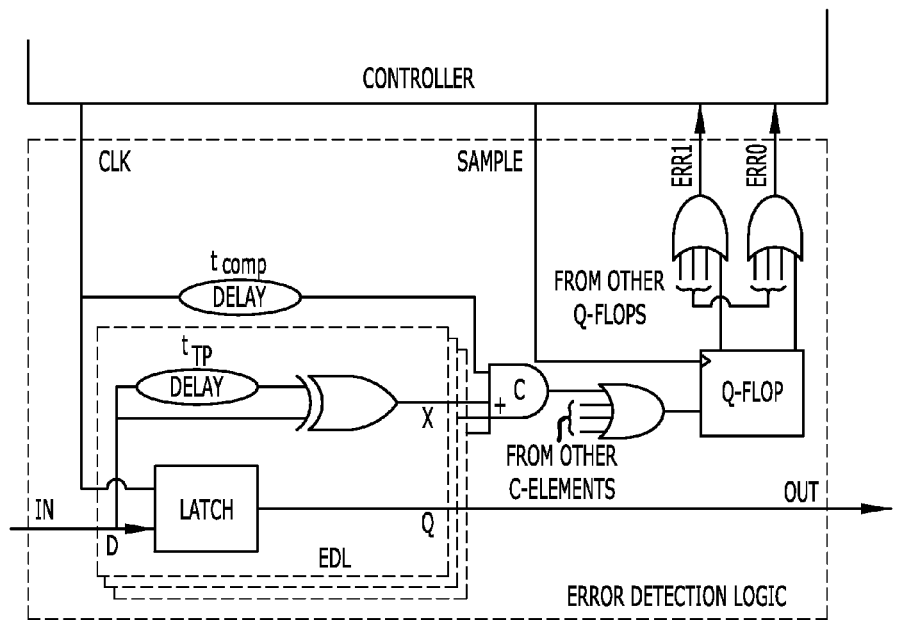
FIG. 3 is an example of error detection logic that may have an error detecting latch, a C-element and OR gate to gather error signals from multiple error detecting latches, a Q-Flop with dual-rail outputs for sampling whether an error occured, and an OR and AND gate to gather the dual-rail outputs across multiple Q-Flops.

As illustrated in FIG. 3, the error detection logic may have EDLs, generalized C-elements, and Q-Flops, F. Rosenberger, C. Molnar, T. Chaney, and T.-P. Fang, "*Q-Modules: Internally Clocked Delay-Insensitive Modules,*" *IEEE Trans. on Computers*, vol. 37, no. 9, pp. 1005-1018, September 1988. While there are many possible implementations of EDLs (e.g., K. Bowman, J. Tschanz, N. S. Kim, J. Lee, C. Wilkerson, S. Lu, T. Karnik, and V. De, "*Energy-Efficient and Metastability-Immune Resilient Circuits for Dynamic Variation Tolerance,*" IEEE JSCC, vol. 44, no. 1, pp. 49-63, January 2009; S. Das, C. Tokunaga, S. Pant, W.-H. Ma, S. Kalaiselvan, K. Lai, D. Bull, and D. Blaauw, "*RazorII: In Situ Error Detection and Correction for PVT and SER Tolerance,*" IEEE JSCC, vol. 44, no. 1, pp. 32-48, January 2009; M. Fojtik, D. Fick, Y. Kim, N. Pinckney, D. Harris, D. Blaauw, and D. Sylvester, "*Bubble Razor: Eliminating Timing Margins in an ARM cortex-M3 Processor in 45 nm CMOS Using Architecturally Independent Error Detection and Correction,*" IEEE JSCC, vol. 48, no. 1, pp. 66-81, January 2013; M. T. Moreira, D. Hand, N. L. V. Calazans, and P. A. Beerel, "*TDTB Error Detecting Latches: Timing Violation Sensitivity Analysis and Optimization,*" in Quality Electronic Design, 2015. ISQED '15. International Symposium on, 2015), a custom design may be based on the Transition Detecting Time Borrowing (TDTB) latches proposed in K. Bowman, J. Tschanz, N. S. Kim, J. Lee, C. Wilkerson, S. Lu, T. Karnik, and V. De, "*Energy-Efficient and Metastability-Immune Resilient Circuits for Dynamic Variation Tolerance,*" IEEE JSCC, vol. 44, no. 1, pp. 49-63, January 2009, a functional block diagram of which is shown in FIG. 3. The already low overhead of the TDTB may be further reduced by integrating the transition detector into the pass-gate latch circuit, where inherit internal latch delays are repurposed to replace the $t_{TD}$ delay line connected to the XOR gate. The XOR gate itself can also be optimized at the transistor level to improve the transition detector's sensitivity, M. T. Moreira, D. Hand, N. L. V. Calazans, and P. A. Beerel, "*TDTB Error Detecting Latches: Timing Violation Sensitivity Analysis and Optimization,*" in Quality Electronic Design, 2015. ISQED '15. International Symposium on, 2015.

The generalized C-elements in FIG. 3 may also be designed at the transistor level using the flow proposed in, M. Moreira, B. Oliveira, J. Pontes, F. Moraes, and N. Calazans, "*Adapting a C-Element Design Flow for Low Power,*" in ICECS, December 2011, pp. 45-48, and act to temporarily remember violations detected by the EDL during the high phase of CLK. While the input connected to CLK is symmetric, which may be required for both low-to-high and high-to-low output transitions, the X signal from the EDL may feed a positive asymmetric input, which may only affect low-to-high transitions. Accordingly, the generalized C-element will switch to 0 if CLK is at 0 and to 1 only if both CLK and the X input are at 1. This creates a memory cell that temporarily stores any violation detected by the EDL during the high phase of CLK, i.e. during the TRW. A compensation delay is added by the $t_{comp}$ delay line, the purpose of which is explained below in the Timing Constraints section.

Under normal operation, the pulse on X may be sufficiently large to guarantee the output node of the C-element is fully charged, indicating an error has occurred while CLK is high, as outlined in M. T. Moreira, D. Hand, N. L. V. Calazans, and P. A. Beerel, "*TDTB Error Detecting Latches: Timing Violation Sensitivity Analysis and Optimization,*" in Quality Electronic Design, 2015. ISQED '15. International Symposium on, 2015. However, because the data may violate the setup time of the EDLs, the X signal and the C-element may exhibit metastability, as is further discussed in below in the Metastability Analysis section. To ensure safe operation, this metastability may need to be filtered out before reaching the main controller. In synchronous designs, the filtering may be handled through multi-stage synchronizers increasing the latency of error detection dramatically. In contrast, the output of the C-element in the example BDARC stage is sampled at the end of the TRW using a Q-Flop, which contains a metastability filter that may prevent the dual rail output signal, Err, from ever becoming metastable, even if the C-element is in a metastable state. The BDARC controller may simply wait for the dual-rail Err signal to evaluate to determine whether or not an error occurred, gracefully stalling until metastability is resolved.

To minimize area overheads due to error detection, it may be desirable to amortize the cost of the C-elements and Q-Flops across multiple EDLs. As shown in FIG. 3, a 4-input generalized C-element can combine the X signals of 3 EDLs using parallel inputs such that an error from any of the three EDLs triggers the C-element output to fire. An OR gate can further combine 4 C-elements before reaching a Q-Flop. In this scenario, a single Q-Flop may accurately catch errors and filter metastability from 12 EDLs. Counterintuitively, this added delay may provide timing benefits in addition to multifaceted area savings, as is explored below in the Timing Constraints section. Note that the C-element's static implementation, P. Beerel, R. Ozdag, and M. Ferreti, "*A Designer's Guide to Asynchronous VLSI*," Cambridge University Press, 2010, makes it undesirable to have more than 4-inputs as the PMOS stack grows too large.

To further reduce area and power overheads of the error detection logic, two additional micro-architectural optimizations may be considered. First, not every pipeline stage need be error-detecting and non error-detecting stages can time borrow. Time-borrowing stages permit data to pass through the latch during the entire time it is transparent without flagging any violations. In particular, alternating between error-detecting and time-borrowing stages can work well as this effectively halves the overhead of error detection logic while still providing sufficient resiliency. Secondly, a stage's critical path is defined as the longest possible input to output path in the combination logic, which sets the endpoint of the TRW. If another path has delay within the TRW it is said to be "near-critical". Optionally, only latches that terminate near-critical paths[1] need be error detecting, further reducing the number of EDLs required in the entire design.

[1] Note that by definition a critical path is also "near-critical".

--Speculative Handshaking Protocol\

Figure 4:
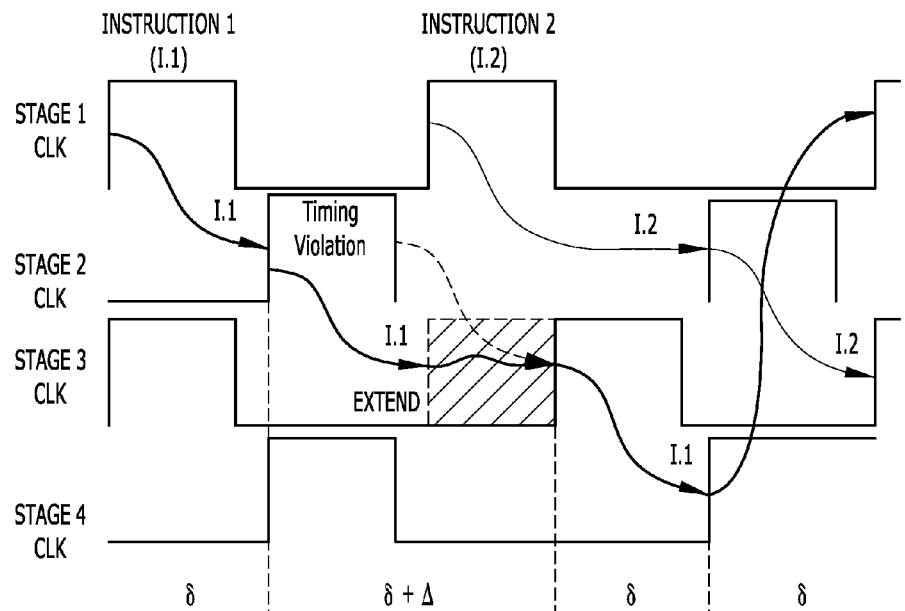
FIG. 4 is a timing diagram of the BDARC template illustrating the nominal delay between local clock signals across 4 neighboring pipeline stages and what happens to the local clock signals when a timing violation occurred.

The BDARC template may rely on a new form of asynchronous handshaking: speculative handshaking. To understand this protocol, an example is introduced of how the CLK signals of four BDARC stages in a pipeline may look, shown in FIG. 4. As Instructions 1 and 2 flow through the pipeline, the arrows indicate the dependency of one clock signal on another. Instruction 1, labeled I.1, launches from Stage 1 at time zero. While Stage 2's latch is transparent, a timing violation occurs indicating the δ delay line in Stage 1 was shorter in duration than the combinational logic path. The rising edge of Stage 3's CLK signal may nominally be scheduled to occur δ time units after Stage 2's, shown as the dotted gray region; however, the timing violation may extend this time, giving Instruction 1 a total of δ+Δ to pass from Stage 2 to Stage 3. Conversely, Instruction 2, labeled I.2, does not suffer a timing violation in Stage 2, which may allow Stage 3's CLK signal to activate δ time units after Stage 2's.

Figure 5A:
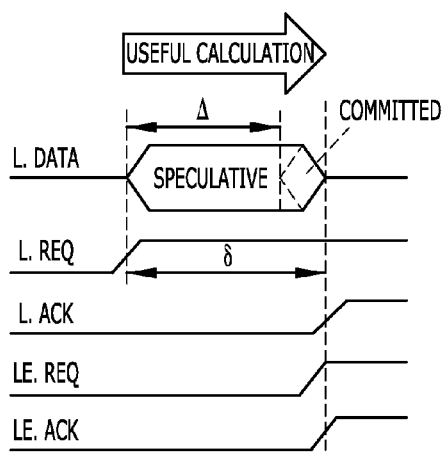
FIGS. 5A and 5B illustrate a speculative handshaking protocol showing a speculative communication between pipelines stages that occurs (assuming no error, FIG. 5A) as well as the delayed communication when a timing violation occurs (FIG. 5B). In particular, the speculative communication is L.req going high and indicates that, assuming no error occurred, data is valid and the delayed communication is performed by delaying LE.ack going high, as shown in FIG. 5B, and this delay is added only if a timing violation occurs.
Figure 5B:
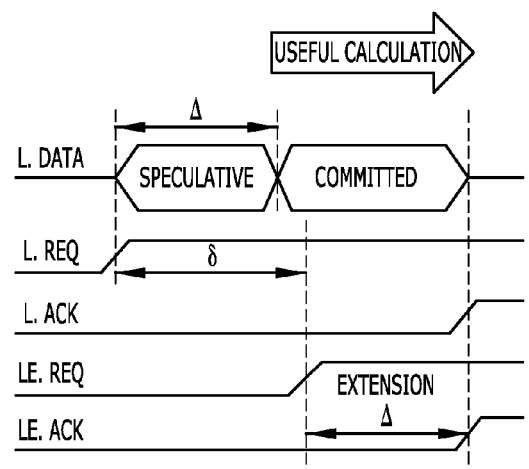

An example of the speculative handshaking protocol that may achieve this behavior using two-phase signaling is shown in FIGS. 5(a) and 5(b). Here, a BDARC stage speculatively receives a request and data value on its L channel. The request passes through the δ delay line before reaching the BDARC controller while the speculative data propagates the combinational logic. The BDARC controller then checks with the previous stage's controller if the speculative request was sent before the input data was actually stable, i.e., if the previous stage experienced a timing violation. This action is implemented via a second handshake on the pull-channel LE. When no timing violations occur in the previous stage (FIG. 5(a)), the LE.req signal is immediately acknowledged by LE.ack, indicating the speculative request was correct and no extension is required. In FIG. 5(b), on the other hand, a timing violation occurs in the previous stage causing the LE.ack signal to be delayed by Δ time units while the final, committed input data passes through the stage's combinational logic. In both cases this stage is given a nominal delay of δ to process stable data.

In addition, notice that for this particular implementation of the speculative handshaking protocol the information of whether a timing violation occurred is not directly transmitted between stages; rather, this information is encoded into the variable response time between LE.req and LE.ack. Additionally, the R.req signal of the controller, not shown in FIG. 5(a) nor FIG. 5(b), is coincident with the arrival of LE.ack, which forces the R channel request to be delayed by Δ as well when an extension is necessary. Other methods of transmitting this information between stages are possible, such as using a "1 of N" channel to communicate whether an error occurred or not, followed by activating another local delay to wait the required amount of time for extension. Similarly, the LE channel can be implemented as a push channel rather than a pull channel.

--Metastability Analysis

Since the input data may stabilize sometime after the opening of the latch, BDARC's susceptibility to metastability (MS) must be examined. For the purposes of this document, the example implementation of FIG. 1 and FIG. 2 will be used for analysis. Analysis of other implementations may be similar.

MS in the datapath is not a concern as we ensure Δ is set sufficiently large as to avoid closing the latch while the datapath is still evaluating. However, certain internal nodes of the error detection logic can become metastable due to several different scenarios:

Scenario M1: A data transition occurring near the rising edge of CLK will cause a pulse on the X output of the EDL to occur before the rising edge of CLK arrives at the generalized C-element. In this case, the C-element may only partially discharge its internal dynamic node, resulting in metastability at the output. Fortunately, the width of the timing window in which this can occur is sufficiently small that timing violations caused by these transitions are short in duration and their impact can be absorbed by the following stage. Consequently, the value to which metastability resolves is not critical and the circuit will work correctly regardless of the value to which the Q-flop eventually resolves.

Scenario M2: Late transitions in the datapath can cause pulses on the EDL's X output that are coincident to the falling edge of CLK. Similarly, the rising edge of the C-element's output may coincide with the rising edge of the Q-Flop's sampling signal. Timing violations in this case indicate the datapath is so slow that it exceeds our timing resiliency window and such circuits should be filtered out during post-fabrication testing.

Scenario M3: Datapath glitches that occur in the middle of the TRW may also induce metastability in the C-element. However, through careful design of the EDL, these input glitches may only cause glitches on the X output and not the data output, M. T. Moreira, D. Hand, N. L. V. Calazans, and P. A. Beerel, "*TDTB Error Detecting Latches: Timing Violation Sensitivity Analysis and Optimization,*" in Quality Electronic Design, 2015. ISQED '15. International Symposium on, 2015, i.e. the transition detector is more sensitive to glitches than the data latch itself. Consequently, metastability in this scenario only affects performance but not correctness, just as MS in Scenario M1. Moreover, the probability of entering MS can be reduced by making the generalized C-element more sensitive to glitches than the transition detector.

In rare cases, the output of the Q-Flop will take an arbitrarily long time to resolve due to internal MS. In a robust synchronous design, similar resolution delays translate directly into increased margins or extra clock cycles and synchronizers to wait for this rare occurrence to resolve. However, due to the asynchronous nature of our template, the BDARC controller will gracefully wait for the metastable state to resolve before allowing the next stage to open its latch, effectively stalling the stage and ensuring correct operation. This is a significant benefit of asynchronous design which, to the best of our knowledge, cannot be easily approximated in synchronous alternatives.

--BDARC Controllers

The BDARC controller may be implemented using a number of techniques (e.g., R. Fuhrer, B. Lin, and S. Nowick, "Symbolic Hazard-Free Minimization and Encoding of Asynchronous Finite State Machines," in ICCAD, November 1995, pp. 604-611; R. M. Fuhrer, N. K. Jhay, B. Linz, L. Plana, and et al., "Minimalist: An Environment for the Synthesis, Verification and Testability of Burst-Mode Asynchronous Machines," 1999; and J. Cortadella, M. Kishinevsky, A. Kondratyev, L. Lavagno, and A. Yakovlev, "Methodology and Tools for State Encoding in Asynchronous Circuit Synthesis," in DAC, June 1996, pp. 63-66). Two examples of possible BDARC controller specifications are given. The first is implemented as a set of three interacting Burst-Mode state machines, R. Fuhrer, B. Lin, and S. Nowick, "Symbolic Hazard-Free Minimization and Encoding of Asynchronous Finite State Machines," in ICCAD, November 1995, pp. 604-611, shown in FIG. 6, which can be synthesized using the tool 3D, K. Yun, D. Dill, and S. Nowick, "Synthesis of 3D Asynchronous State Machines," in ICCD, October 1992, pp. 346-350. In particular, this specification is for pipeline stages with EDLs.

Intermediate signals goL, goR, and goD are communication signals between the three individual state machines, and signals delay, edi, and edo are used to add the Δ delay line into the controller. For simplicity, the delay line is duplicated between CLK→delay and edo→edi. Consolidating these to a single delay may be possible.

It is also possible to extend this controller to a token version, which generates an output request after reset, as well as simplified versions for stages without error detection logic, creating four distinct BDARC controllers. For all cases, the implicit fundamental mode timing assumption, R. Fuhrer, B. Lin, and S. Nowick, "Symbolic Hazard-Free Minimization and Encoding of Asynchronous Finite State Machines," in ICCAD, November 1995, pp. 604-611, can be validated using a simulation environment with random environmental delays.

A Petri Net (PN) is another common method to describe controllers for synthesis. PNs can be formally analyzed for correctness and delay sensitivity. PNs can also be synthesized to library gates and C-Elements using well-known methods and tools.

Figure 7:
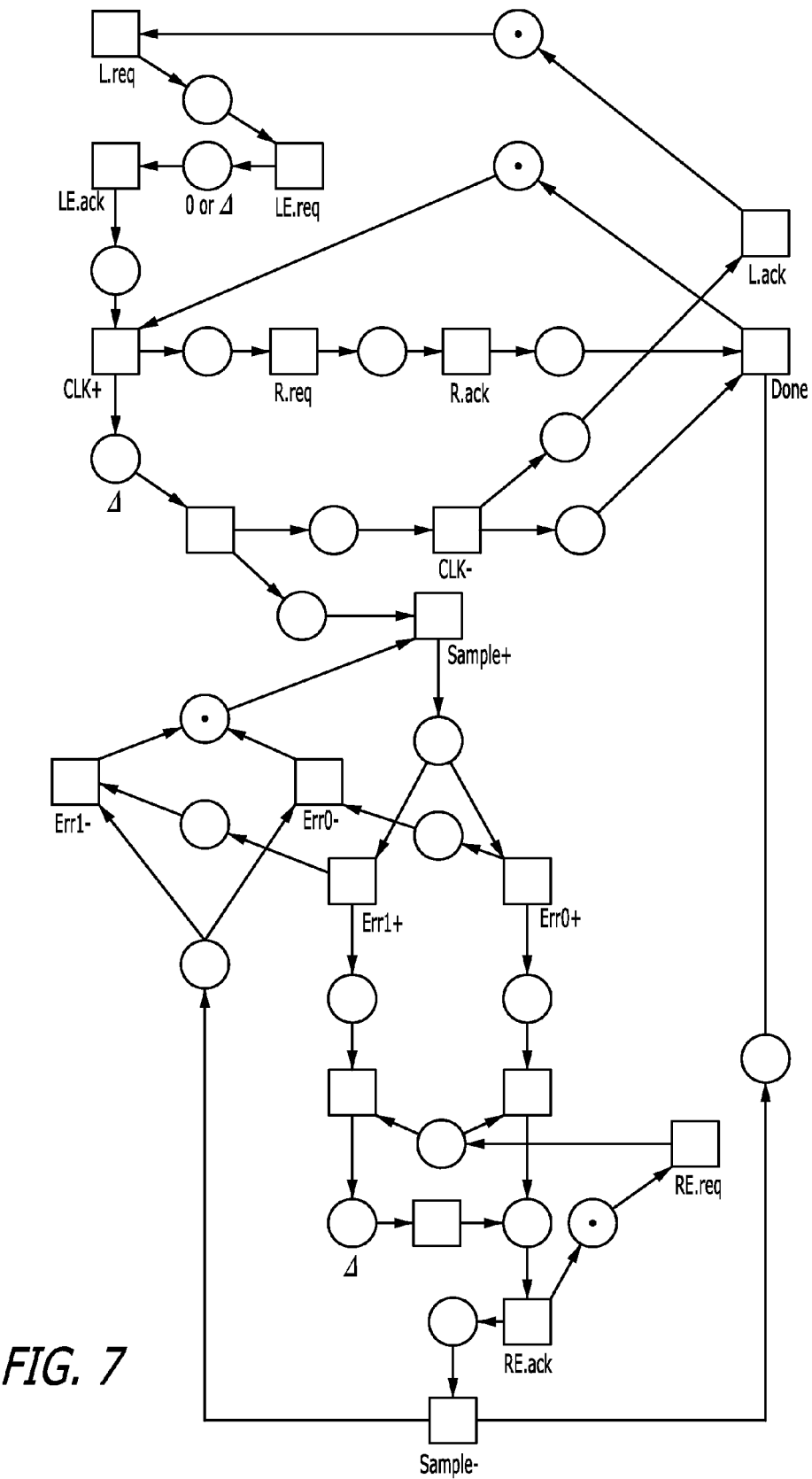
FIG. 7 illustrates one possible Petri net description of a BDARC controller.

The PN in FIG. 7 shows just one of many possible realizations of the BDARC controller. Unlabeled transitions are internal states and shown only for completeness. Places with delay due to the BDARC protocol are labeled with Δ, while unlabeled places have no additional delay. The place between LE.req and LE.ack is labeled "0 or Δ" to indicate the environment's variable delay of acknowledging the request on the extend channel, which is dependent on an error occurring in the previous stage, as described below. This particular implementation uses a dual-rail Err input to the controller, which allows the stage to stall when resolving metastability as explained below. This controller has been implemented and tested in behavioral Verilog to verify the protocol and analyze its performance.

--Timing Constraints

The datapath in BDARC most closely resembles a standard time borrowing design, K. Sakallah, T. Mudge, and O. Olukotun, "Analysis and Design of Latch-Controlled Synchronous Digital Circuits," IEEE Trans. on CAD, vol. 11, no. 3, pp. 322-333, March 1992. However, the introduction of error detecting stages as well as the error detection logic itself alters these constraints making the analysis of BDARC timing constraints similar to that of Bubble Razor, M. Fojtik, D. Fick, Y. Kim, N. Pinckney, D. Harris, D. Blaauw, and D. Sylvester, "Bubble Razor: Eliminating Timing Margins in an ARM Cortex-M3 Processor in 45 nm CMOS Using Architecturally Independent Error Detection and Correction," IEEE JSCC, vol. 48, no. 1, pp. 66-81, January 2013.

Figure 1A:
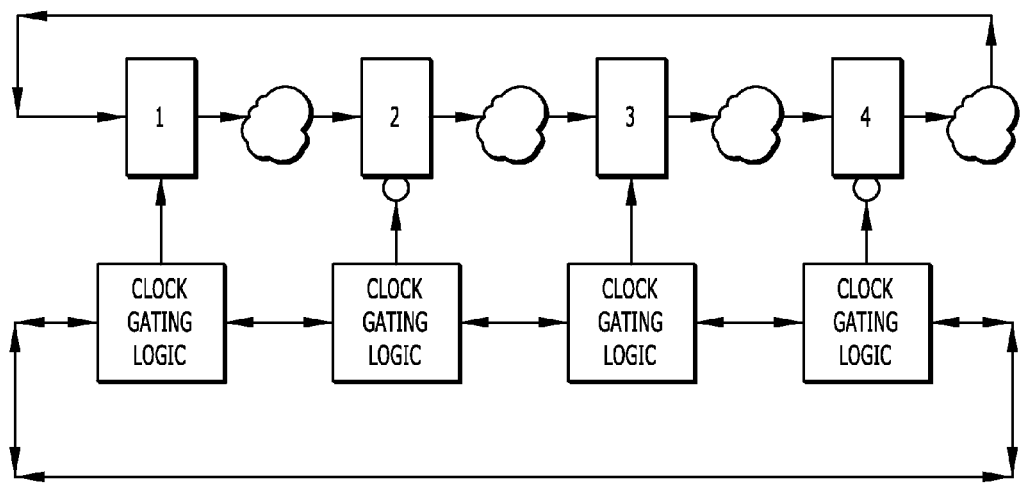
FIG. 1A is a block diagram of Bubble Razor.
Figure 1B:
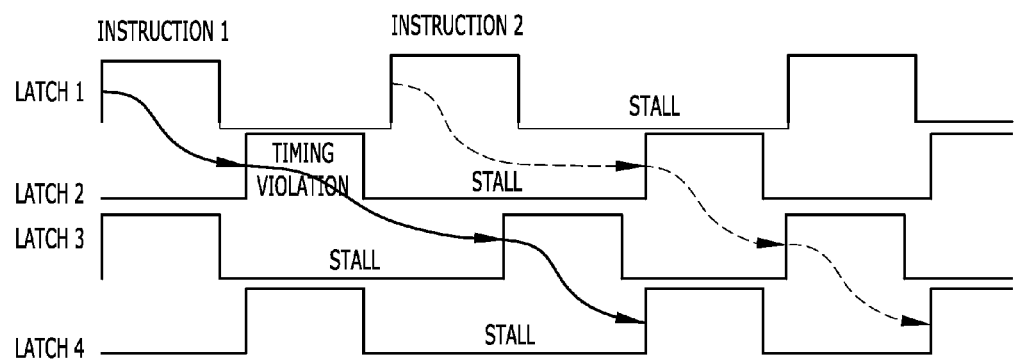
FIG. 1B is a timing diagram of the latch signals driven by its clock gating logic illustrating what happens when a timing violation occurs.
Figure 8:
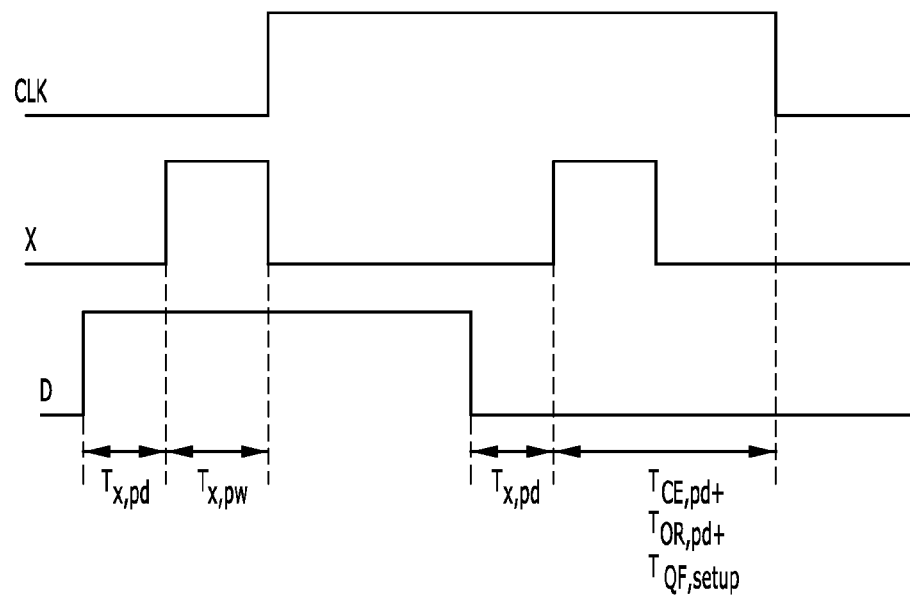
FIG. 8 is a timing diagram of possible key BDARC signals indicating delays that may be necessary to describe the timing constraints in a BDARC template.

The annotated timing diagram of the CLK, X, and D signals for a single error detecting BDARC stage in FIG. 8 shows the overheads associated with the error detection logic for the example implementation of FIG. 1 and FIG. 2. Analysis of other implementations may be similar. The delay through the error detection logic may have five components:
(i) propagation delay from D to X of the EDL, $t_{X,pd}$;
(ii) output pulse width of pin X, $t_{X,pw}$;
(iii) C-element propagation delay, $t_{CE,pd}$;
(iv) Q-Flop setup time, $t_{QF,setup}$; and
(v) propagation delay of the OR gate between the C-elements and Q-Flop, $t_{OR,pd}$ $t_{X,pd}$ and $t_{X,pw}$ may enforce a large setup time before the EDL becomes transparent to ensure a transition before the rising edge of CLK is not flagged as a timing violation. Therefore, a small compensation delay $t_{comp}=t_{X,pd}+t_{X,pw}$ is added to the CLK input of the C-element, as seen in FIG. 3, to prevent these unintended errors.

-- --Timing Resiliency Window

The actual size of the timing resiliency window may be affected by each of the error detection logic delays. In particular, the TRW can be defined as:

$$TRW = \Delta + t_{X,pw} - (t_{CE,pd} + t_{OR,pd} + t_{QF,setup}) \quad (1)$$

$t_{X,pd}$ may impact the TRW in two ways: positively for transitions occurring near the rising edge of the CLK and negatively for transitions at the falling edge. Hence this term may cancel out in (1).

-- --Propagation Delay

When using the optimizations described in the Error Detection Logic section above, there may be three potential logic path end points. First, pipeline stages that do not have error detection use regular latches that allow time borrowing. Second, latches in error detecting pipeline stages that are not on near-critical paths are not converted to EDLs and have constraints similar to flops. Finally, the EDLs in error detecting stages are the end points for paths with delay longer than δ.

For paths ending at non-error detecting stages, the propagation delay is simply:

$$t_{pd,TB} \leq \delta + \Delta - t_{latch,CQ} - t_{latch,setup} \quad (2)$$

where $t_{latch,CQ}$ is the clock to Q delay of the source latch and $t_{latch,setup}$ is the setup time of the sink latch[2]. For paths ending at non-error detecting latches in an error detecting stage, the propagation delay is also straightforward:

$$t_{pd,NE} \leq \delta - t_{latch,CQ} \quad (3)$$

[2] This equation assumes that each stage can borrow the maximum amount of Δ, which occurs when time borrowing and non-time borrowing stages are alternated. See K. Sakallah, T. Mudge, and O. Olukotun, "Analysis and Design of Latch-Controlled Synchronous Digital Circuits," IEEE Trans. on CAD, vol. 11, no. 3, pp. 322-333, March 1992 for the more general time borrowing constraints.

Latch setup time is not included in this constraint because the data is arriving at the rising edge of clock, i.e. when the latch becomes transparent.

Finally, the propagation delay of paths ending at EDLs can be derived as:

$$t_{pd,E} \leq \delta + TRW - t_{latch,CQ} \quad (4)$$

where TRW is defined as in (1). Latch setup time does not appear here either, as the requirement to meet the TRW is always stricter than the latch's setup time.

Contamination Delay

The BDARC controller may enforce a condition that latches of neighboring stages cannot be transparent at the same time, which provides significant hold time margin. When including the clock tree delays, $t_{CLK,pd}$, the hold time constraint between two stages is:

$$t_{cd} \geq (t_{CLK_R,pd} - t_{CLK_L,pd}) - t_{ack\_to\_clk} \quad (5)$$

where L and R represent two neighboring stages and $t_{ack\_to\_clk}$ is the delay from R's controller generating an acknowledgement signal to L's controller raising its clock signal. In practice, $t_{ack\_to\_clk}$ is around 4 gate delays, making $t_{cd}$ small or even negative for balanced local clock trees. This is in contrast to many resiliency schemes which exacerbate hold time issues (e.g. M. Fojtik, D. Fick, Y. Kim, N. Pinckney, D. Harris, D. Blaauw, and D. Sylvester, "*Bubble Razor: Eliminating Timing Margins in an ARM Cortex-M3 Processor in 45 nm CMOS Using Architecturally Independent Error Detection and Correction,*" IEEE JSCC, vol. 48, no. 1, pp. 66-81, January 2013).

-- --Hiding Handshaking Overhead

After a request is received at a BDARC controller, a full two-phase handshake must occur on its LE channel to check if the previous stage suffered a timing violation. Even when no violations occur, this process takes a non-zero amount of time, $t_{EC}$, due to gate delays in the two controllers. Fortunately, this delay can be hidden completely by shortening the stage to stage delay, δ, by $t_{EC}$. If δ is not shortened, the circuit will still operate correctly but with slower performance.

-- --Maximum Timing Resiliency Window

To compute the maximum width of the timing resiliency window, $TRW_{max}$, a few additional delays may be defined:

$t_{QF,pd}$: the nominal propagation delay from the sample input to the outputs of the Q-Flop without metastability;

$t_{ET,pd}$: the maximum propagation delay of the AND and OR trees that collect the individual dual-rail error signals from the Q-Flops.

To find $TRW_{max}$, it may also be helpful to first define $\Delta_{max}$, the maximum clock pulse width for a BDARC stage. Because opening the latch of one stage depends on checking if an error occurred in a previous stage, Δ cannot be equal to δ and still achieve the expected cycle time including overheads. Therefore, $\Delta_{max}$ is conservatively set as:

$$\Delta_{max} = \delta - t_{ET,pd} - t_{QF,pd} - t_{Err[0]\_to\_clk} \quad (6)$$

where $t_{Err[0]\_to\_clk}$ is the internal controller delays from receiving Err[0] one controller to raising the clock signal in the subsequent stage. Combining (1) and (6):

$$TWR_{max} = \delta - t_{ET,pd} - t_{QF,pd} - t_{Err[0]\_to\_clk} + t_{X,pw} - (t_{CE,pd} + t_{OR,pd} + t_{QF,setup}) \quad (7)$$

In some cases, a large TRW may not be ideal and setting it to 20-30% may be sufficient, as was done in M. Fojtik, D. Fick, Y. Kim, N. Pinckney, D. Harris, D. Blaauw, and D. Sylvester, "*Bubble Razor: Eliminating Timing Margins in an ARM Cortex-M3 Processor in 45 nm CMOS Using Architecturally Independent Error Detection and Correction,*" IEEE JSCC, vol. 48, no. 1, pp. 66-81, January 2013). In addition, reasonable estimates of $t_{CE,pd}$ and $t_{QF,setup}$ in a modern process are on the order of tens of ps. However, the magnitude of $t_{ET,pd}$ and $t_{OR,pd}$ depend on multiple factors, including the number of EDLs per stage and the degree to which the EDLs are amortized across Q-Flops. This presents an interesting optimization problem in which reducing the number of EDLs may also maximize the potential performance of the design.

--Performance Analysis

-- --Delay Distributions

Delay variations in the datapath can be attributed to three main sources: global variation, local variations, and data dependency. It is common to model random local and global variations in circuits using normal distributions. However, it has been shown that heavy tail distributions, such as log-normal, are more suitable in near-threshold domains, B. Zhai, S. Hanson, D. Blaauw, and D. Sylvester, "*Analysis and Mitigation of Variability in Subthreshold Design,*" in *Low Power Electronics and Design,* 2005. ISLPED '05. Proceedings of the 2005 International Symposium on, August 2005, pp. 20-25; J. Kwong and A. Chandrakasan, "*Variation-Driven Device Sizing for Minimum Energy Sub-Threshold Circuits,*" in *ISPLED,* October 2006, pp. 8-13. Therefore, both normal and log-normal distributions may be analyzed with the proposed performance model. Data dependency, on the other hand, may not be as well defined; it may be determined by many factors, including architectural description, logic synthesis, and input data.

To simplify the analysis and abstract the various sources of variation, it may be desirable to consider a single delay distribution. According to J. Kwong and A. Chandrakasan, "*Variation-Driven Device Sizing for Minimum Energy Sub-Threshold Circuits,*" in *ISPLED,* October 2006, pp. 8-13; C. Schwartz and Y. S. Yeh, "*On the Distribution Function and Moments of Power Sums with Log-Normal Components,*" *Bell System Technical Journal,* vol. 61, no. 7, pp. 1441-1462, 1982. [Online]. Available: http://dx.doi.org/10.1002/j.1538-7305.1982.tb04353.x, it may be reasonable to represent the sum of two normal or log-normal random variables as another normal or log-normal random variable, respectively. In this way, the analyses presented herein are based on combined distributions with a σ/μ that can be considered to encompass all sources of variation.

-- --Systematic Error Rate

In both the normal and log-normal distributions, there is a non-zero probability of experiencing an infinitely large delay value, i.e. it is impossible to set a traditional clock cycle time that would catch all variations with 100% probability. Therefore, a notion of Systematic Error Rate (ξ) may need to be introduced to define an upper bound on the worst case performance of the circuit ξ sets an acceptable amount of errors that may be allowed during operation of the circuit, which is typically a very small value, e.g. in G. Zhang and P. Beerel, "*Stochastic Analysis of Bubble Razor,*" in *DATE,* March 2014, pp. 1-6, the authors assume ξ≤0.1%. For traditional circuits, ξ is calculated as:

$$\xi = 1 - [P_R\{D \leq C\}]^N \quad (8)$$

where D is a random variable representing the delay of the worst case path between two sequential elements, C is the clock period, $P_R(x)$ is defined to be the probability of event x occurring, and N is the number of stages in the circuit.

-- --BDARC Performance Model

There are two main timing parameters of BDARC example implementation as shown in FIG. 1 and FIG. 2: the δ and Δ delay lines, where Δ sets the length of the TRW. Other implementations may feature similar important timing parameters, which can then be used in this analysis.

Compared to a traditional synchronous circuit with clock period C, the following can be set C=δ+Δ. Therefore, a trade off in setting these values emerges as decreasing δ allows the system to operate faster if no timing violations (errors) occur; however, the shorter stage-to-stage delay means that more transitions will occur while the latch is transparent, thereby increasing the frequency of errors that force subsequent pipeline stages to be delayed by the now larger Δ value, as C remains constant.

Figure 9:
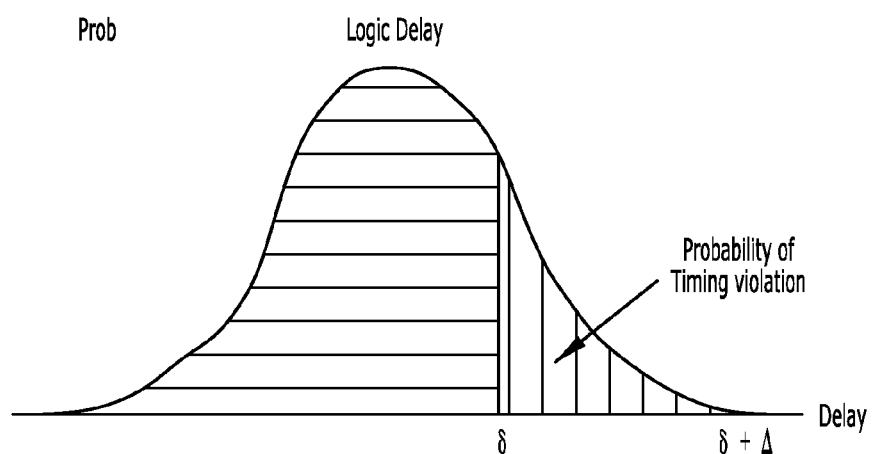
FIG. 9 is a Logic delay distribution model showing the area under the curve to the right of 6 that represents the probability of a timing violation.

To quantify this optimization problem, consider a delay distribution of a combinational logic block between two latches as shown in FIG. 9. The area of the vertically-lined region represents the probability that an error occurs at a previous output latch, defined as p, such that the effective delay of this pipeline stage is δ+Δ. The area of the horizontally-lined region is thus 1−p. The performance of a pipeline stage may be modeled as a discrete two-valued distribution, which yields the following equation for average delay of a BDARC stage:

$$\bar{d} = \delta + p \cdot \Delta \quad (9)$$

The optimal performance of simple structures, such as N-stage rings, may occur when each stage's average-case delay is minimized, i.e. when $\bar{d}=d_{min}$. Furthermore, in practice this equals the effective cycle time (EC) of the design, as introduced in G. Zhang and P. Beerel, "Stochastic Analysis of Bubble Razor," in DATE, March 2014, pp. 1-6. In this way, the asynchronous and synchronous implementations can be compared directly by their ECs, where EC=C for traditional synchronous designs.

-- --Performance Model for Bubble Razor

Performance models for most synchronous resilient architectures may not be readily available; fortunately, one exists for Bubble Razor, G. Zhang and P. Beerel, "Stochastic Analysis of Bubble Razor," in DATE, March 2014, pp. 1-6. BR is another architecturally independent resiliency scheme, in which a traditional N-stage synchronous design is converted into a 2N-stage retimed, latch-based design and augmented with error detection/correction control circuitry. While BR has been shown to be susceptible to MS, S. Beer, M. Cannizzaro, J. Cortadella, R. Ginosar, and L. Lavagno, "Metastability in Better-than-Worst-Case Designs," in ASYNC, 2014, pp. 101-102, it can be considered as an upper bound on performance of synchronous resilient architectures due to its low, one-cycle penalty for recovering from errors. BR's EC for ring structures is derived through Markov Chain analysis by G. Zhang and P. Beerel, "Stochastic Analysis of Bubble Razor," in DATE, March 2014, pp. 1-6 as:

$$EC = C/[2-(1-p)^{2N}] \quad (10)$$

Implicit in this equation is that as the synchronous clock cycle C decreases, the probability of an error p increases, presenting a tradeoff whose optimal setting yields an optimal effective clock cycle time $EC_{opt}$.

-- --Performance Impact of Non-Ideal Effects in BDARC

-- -- --Robustness to Delay Line Accuracy

Figure 10:
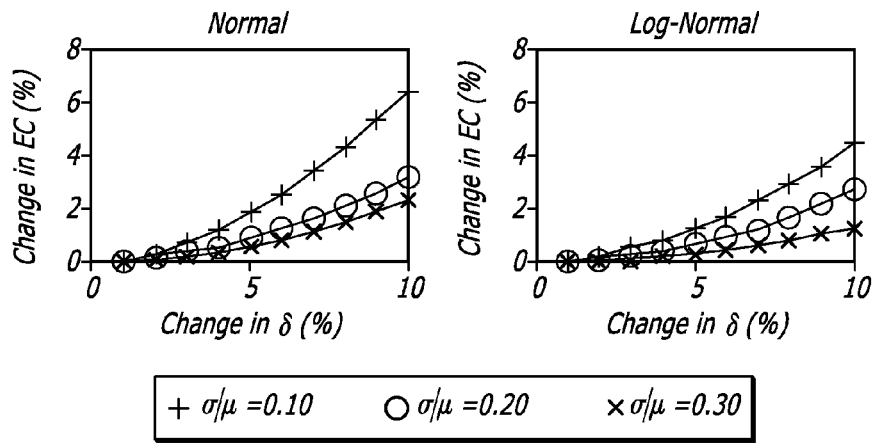
FIG. 10 illustrates the effect of delay line quantization on the Expected Cycle time for normal and log-normal distributions with variance $\sigma/\mu=0.1$, 0.2, and 0.3.

In the given example implementation of BDARC, the δ and Δ delays may be implemented using simple delay lines comprised of inverters or buffers, although other possibilities exist. Using simple inverters and buffers imposes a limit to the accuracy of the delay line. In other words, the total delay of the delay line may be up to one gate delay off from the ideal δ value. Even if the delay lines are tunable, there may still be a quantization of the delay line such that the ideal delay is unobtainable. To quantify the impact, the variation in δ versus the resulting variation in EC is plotted in FIG. 10. For a 10% variation in δ, a 6.3% to 4.7% change in performance may only be seen for normally and log-normally distributed delays, respectively. At 30% variation, the impact drops to 2.3% and 1.3%, respectively.

-- -- --Metastability

Figure 11:
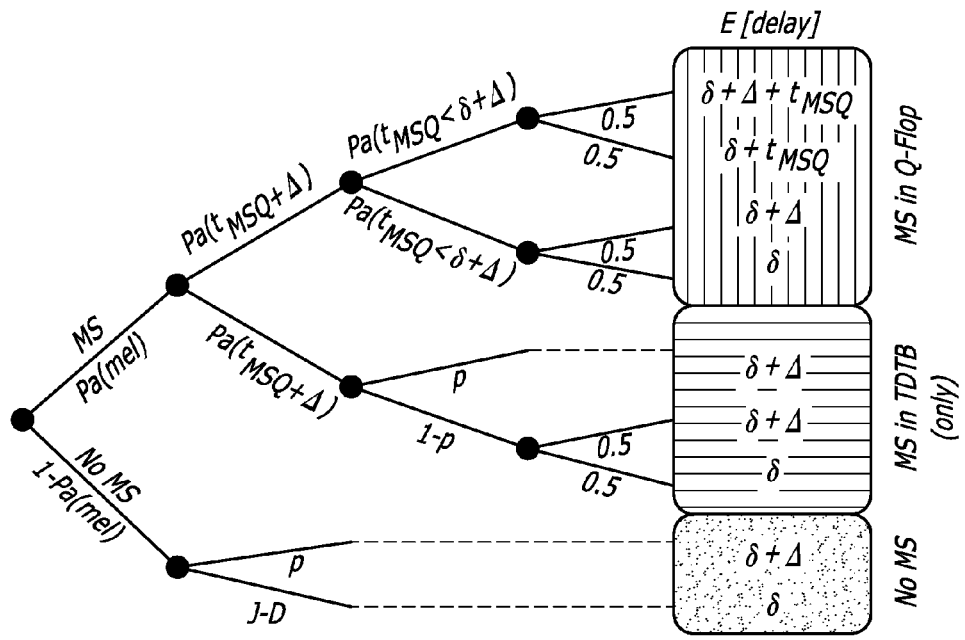
FIG. 11 is a probabilistic tree illustrating different possible expected stage delays, including two delays that contain the resolution time for metastability $t_{MSQ}$.

To analyze the impact of metastability on performance, all possible scenarios may be analyzed, as illustrated in FIG. 11, for the example implementation given in FIG. 1 and FIG. 2. A weighted sum of expected stage delays may also be created based on the probability that each scenario will occur. An event, met, in which MS has occurred in the error detection logic may be defined, and thus the probability of this event as $P_R(met)$. Accordingly, the probability that MS does not occur is then $1-P_R(met)$.

An expected delay associated with each of the nine scenarios may be defined. The expected delays of the two MS-free scenarios, highlighted in checkered blue, are trivially obtained. The remaining scenarios are divided into two categories: MS occurs in the TDTB's E only and MS occurs in both the TDTB and Q-Flop. When MS occurs in the TDTB but resolves before the Q-Flop samples its output at time A, it may be impossible to know whether MS resolved randomly or due to another datapath transition arriving at the TDTB's D input that set the E output to '1'. Therefore, three separate conditions, shown in the horizontally lined region of FIG. 11, should be evaluated: i) a new timing violation occurred with probability p; ii) no violation occurred but MS randomly resolved to '1' with 0.5 probability; or iii) no violation occurred and MS resolved to '0' with 0.5 probability. In the first and second conditions, the total stage delay will be δ+Δ, while the last condition has expected delay of δ.

If MS in the TDTB lasts longer than Δ, then the Q-Flop will sample the unknown value and become metastable itself. However, a stable output from the Q-Flop is not required until the R.Req signal propagates through the δ delay line and the next stage issues a request on its LE channel, as explained above. This allows up to δ−Δ for MS in the Q-Flop to resolve before impacting the performance, shown in the green vertically lined region. Only when MS propagates from the TDTB to the Q-Flop and persists longer than δ−Δ does the time to resolve, $t_{MSQ}$, appear in the expected delay value, shown in the purple region.

Figure 12:
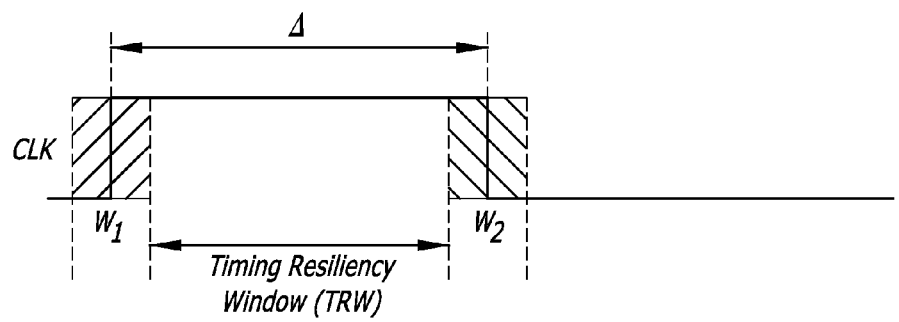
FIG. 12 illustrates timing windows in which metastability may occur in BDARC.

As shown in FIG. 12, a transition in the datapath must occur during the $W_1$ time window to induce MS in the error detection logic. Therefore, the probability of event met based on a normal distribution may be defined as:

$$P_R(met) = \int_{\delta - \frac{w_1}{2}}^{\delta + \frac{w_1}{2}} N(x, \mu, \sigma^2)\, dx \quad (11)$$

To analyze the individual components of this probability, the probability that MS does not resolve in a certain amount of time may be defined. As shown in D. M. Chapiro, "Globally-Asynchronous Locally-Synchronous Systems," Ph.D. dissertation, Stanford Univ., CA., October 1984, this can be defined using two parameters: $t_r$, the time to resolve MS; and λ, a time constant that is derived from simulation of the circuit experiencing MS. Accordingly, $t_{MST}$ and $t_{MSQ}$ may be used as the time to resolve MS in the TDTB and Q-Flop, respectively, and $\lambda_T$ and $\lambda_Q$ as the time constants, respectively. As an example, the probability that MS lasts longer than a time T in the TDTB conditioned on event met occurring is given by:

$$P_R(t_{MST} \geq T | met) = e^{-\lambda_T C^T} \quad (12)$$

Using the same form as (12), the probabilities of each of the branches shown in FIG. 11 can be derived in a similar fashion. To simplify the results, the time constants for the C-element and Q-Flop may be set to be equal, i.e. $\lambda_T = \lambda_Q = \lambda$.

Taking all conditions into consideration and assuming delays are normally distributed, the expected delay per stage can then be calculated as:

$$E[\text{delay}] = (ab+1)\delta + a\left[\frac{1 - p\left(c - \frac{2}{a}\right)}{2} - b\right]\Delta + \frac{ab}{\lambda} \quad (13)$$

where $$a = Q\left(\frac{\delta - \frac{W_1}{2} - \mu}{\sigma}\right) - Q\left(\frac{\delta + \frac{W_1}{2} - \mu}{\sigma}\right) \quad (14)$$

$$b = e^{-\lambda\delta} \quad (15)$$

$$c = e^{-\lambda\Delta} \quad (16)$$

The Q function in (14) is a well-known equation that computes the area under the tail of a normal distribution for a given value in the distribution. The difference between two Q functions is therefore the probability landing in the interval of the two parameters, in our case between $$\delta \pm \frac{W_1}{2}.$$

To quantify the impact of MS, the throughput ratio may be considered, defined as the expected delay with MS (13) divided by the nominal delay (9) versus variation. Here, the following may be set: $\mu=1$ and $\delta$, p, and $\Delta$ according to the analysis presented in the section BDARC performance model. The time constant $\lambda$ and MS window $W_1$ can be derived from either SPICE simulation or more accurately using a physical circuit, as shown in C. Foley, "*Characterizing Metastability*," in *ASYNC*, March 1996, pp. 175-184, where the authors obtained $\lambda=3$ and $W_1=0.07$ using an older process. As an example, using these values, computation shows that the expected impact on throughput for normally distributed data delays with $\sigma/\mu$ of 0.1, 0.2, and 0.3 is 1.5%, 1.1%, and 0.9%, respectively. In addition, modern processes will tend to feature a larger $\lambda$, smaller $W_1$, and greater variation due to PVT and unbalanced propagation delays, further reducing the performance impact of MS, S. Beer, R. Ginosar, M. Priel, R. Dobkin, and A. Kolodny, "*An On-Chip Metastability Measurement Circuit to Characterize Synchronization Behavior in 65 nm*," in *ISCAS*, May 2011, pp. 2593-2596. In other words, we conclude that it is reasonable to use (9) directly to model performance because the impact on stage delay due to MS is exceedingly small.

--Comparison Results

Figure 13A:
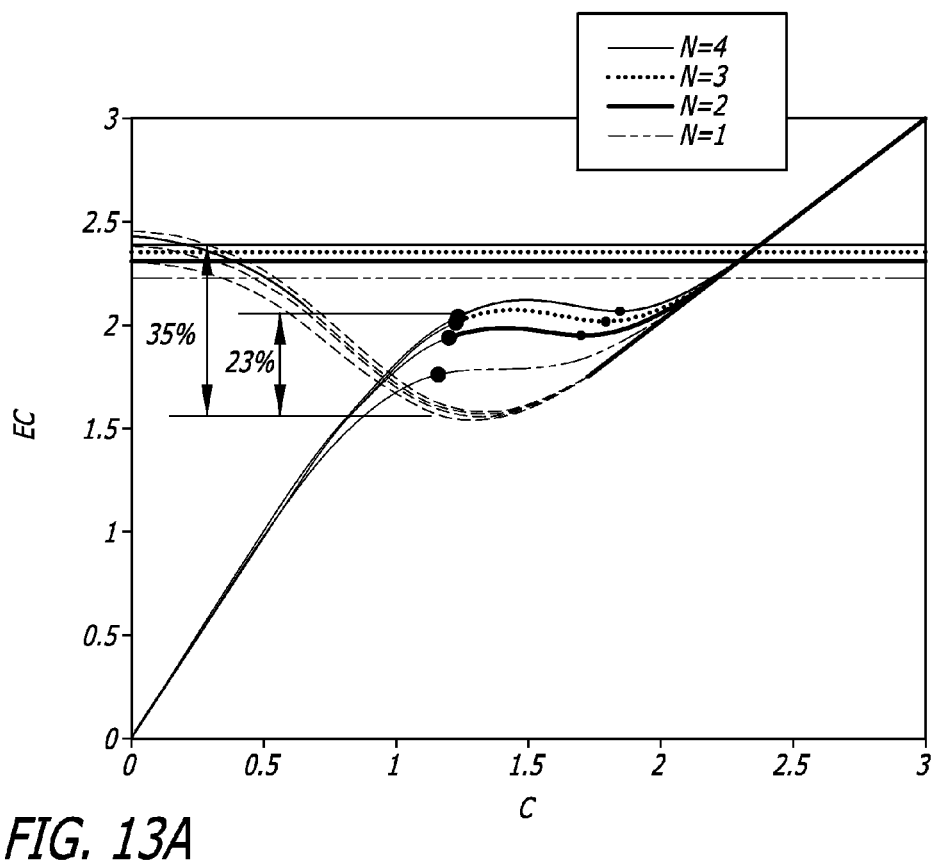
FIGS. 13A-13B are BDARC comparisons.
Figure 13B:
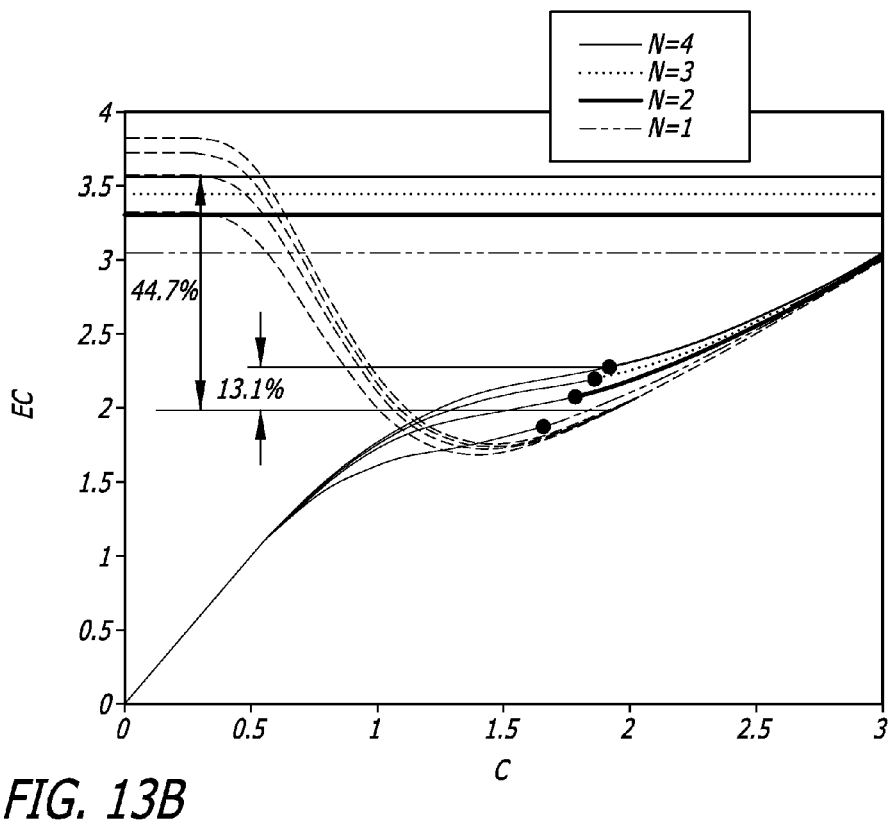

The performance improvements of both Bubble Razor and BDARC over the traditional synchronous design on N-stage rings may be compared. To match the results presented in G. Zhang and P. Beerel, "*Stochastic Analysis of Bubble Razor*," in *DATE*, March 2014, pp. 1-6, is fixed at 0.1%, CP=2.5, and C may be swept, which is CP minus TRW, for all designs. FIG. 13A and FIG. 13B compare the EC obtained from each design when the underlying delays are normally and log-normally distributed, respectively, with a moderate amount of variance given both environmental, S. Seo, R. Dreslinski, M. Woh, Y. Park, C. Charkrabari, S. Mahlke, D. Blaauw, and T. Mudge, "*Process Variation in Near-Threshold Wide SIMD Architectures*," in *DAC*, June 2012, pp. 980-987 S. Seo, R. Dreslinski, M. Woh, Y. Park, C. Charkrabari, S. Mahlke, D. Blaauw, and T. Mudge, "Process variation in near-threshold wide SIMD architectures," in DAC, June 2012, pp. 980-987, and data variability ($\sigma/\mu=0.2$) for rings of one to four traditional stages, i.e. N=1 to 4, with each curves labeled corresponding to the number of stages. The horizontal lines represent the performance of the traditional synchronous design and are at different heights because of the relationship between the clock period and the number of stages N in (8) when the SER is fixed. The solid curves represent the performance of BR, and the dotted curves shown results from BDARC. The dot on each BDARC curve indicates the maximum TRW value. The circuit cannot operate at C values smaller than this point. In some cases, the size restriction on TRW occurs before the optimal EC is reached, therefore the optimal setting for TRW is $$\Delta = \frac{CP}{2}.$$

For a 4-stage ring, BDARC's performance improvement is 23% over BR and 35% over traditional synchronous designs assuming normally distributed delays. For log-normally distributed delays with the same variance, the improvement is 13.1% over BR and 44.7% over traditional synchronous design.

--An Alternative Implementation for High-Variance Systems

For systems with high-variance, the timing assumptions of the BDARC template implemented in the Error Detection section above may require that $\Delta \leq \delta$, which can limit average-case performance. That is, for systems with high-variance the ideal nominal delay might be significantly less than half of the worst-case delay. For such systems, an alternative form of the BDARC controller may be used.

Figure 14:
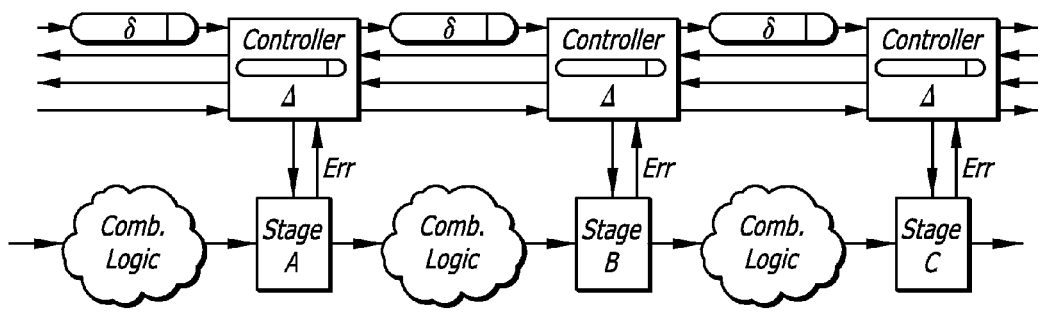
FIG. 14 illustrates three BDARC stages in a pipeline.

The communication channels between controllers may remain the same, but the controller itself may become more complex. Instead of checking the previous stage for errors once, the controller makes two handshakes on the extend channel with the previous stage's controller. The second handshake will be described first, as the first handshake is similar to the one described in the Speculative Handshaking Protocol above. Take for example the simple 3-stage pipeline in FIG. 14. A request generated by Stage A arrives at Stage B after $\delta$. Stage B's controller will accept the request and speculatively open its latch while speculatively forwarding the request to Stage C. Before the controller in Stage B closes its latch, it will send a request on its LE channel to Stage A. If Stage A has detected an error in its EDL, it will delay the acknowledgement of the extend request by $\Delta$, which in turn delays the closing of Stage B's latch by $\Delta$. This allows enough time for the correct data to propagate through the combinational logic between A and B, through B's latch, and into the B to C datapath. However, the request from B to C has already been speculatively sent at this time, so to ensure Stage C latches the correct data, the opening of its latch must be delayed in a manner similar to that described in 2.2. This is implemented using an additional handshake on the LE channel just as the request arrives through the nominal delay line. When Stage C receives the request, it will initiate a handshake on its LE channel to Stage B, which will then acknowledge the extend channel quickly if its latch closed on time (no error in Stage A) or $\Delta$ later if Stage A forced Stage B's latch to close late.

Therefore, the difference between the previous template and this alternative is twofold. First, the controller must delay the closing of its latch if the previous stage suffered an error. Second, the controller must delay the opening of its latch if the previous stage delayed the closing of its latch, or in other words, if an error occurred two stages prior to the current stage.

Figure 15:
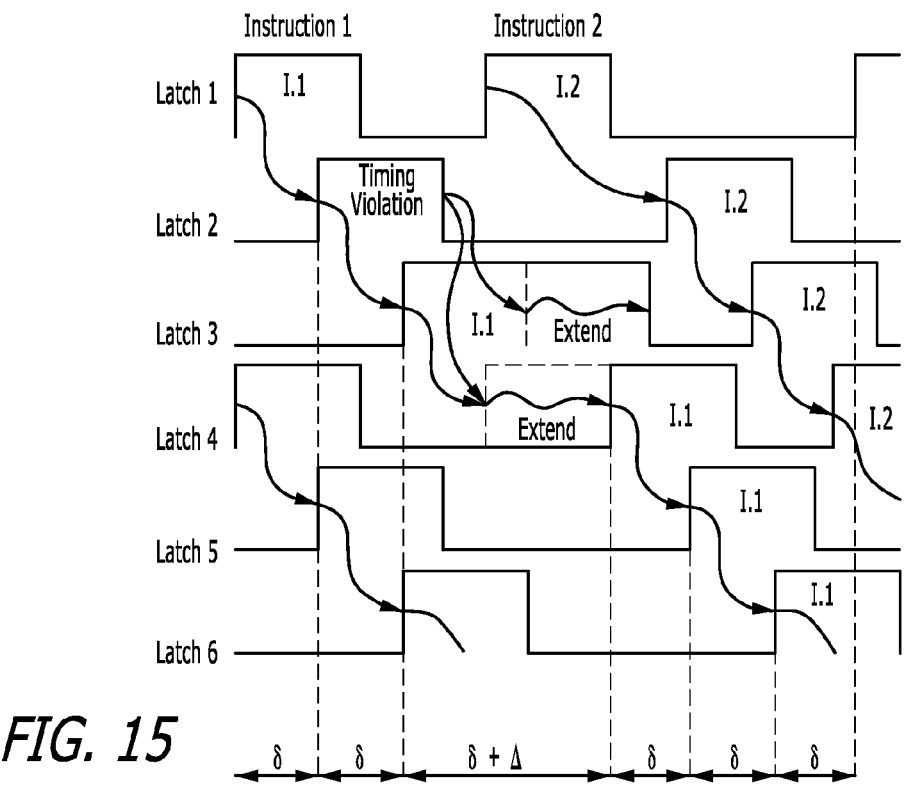
FIG. 15 illustrates another possible timing diagram of a BDARC template in a six-stage pipeline illustrating how the opening and closing of neighboring latches may be extended upon a timing violation.

The timing diagram of this alternative implementation is illustrated in FIG. 15. A timing violation is identified at the falling edge of latch 2. This causes both the subsequent falling edge of latch 3 as well as the rising edge of latch 4 to be delayed by $\Delta$. More specifically, latch 3's controller sends an extend request before closing latch 3, but latch 2's controller will delay the acknowledgement by $\Delta$, forcing latch 3 to remain open for another $\Delta$. Latch 4's controller then sends an extend request to latch 3's controller, which delays the acknowledgement by $\Delta$, forcing latch 4 to remain closed for an additional $\Delta$. Notice that the underlying assumption of this template is that $\Delta \leq 2\delta$ which guarantees the subsequent BDARC controller has time to delay the opening of its latch. In addition, we assume delaying latch 3 by $\Delta$ is sufficient to satisfy our basic SER assumption. Letting the delay of the three stages be $d_1$, $d_2$, and $d_3$, with the same mean and variance, assume that:

$$P_R(d_1+d_2+d_3 \leq 3\delta+2\Delta) \leq P_R(d_1 \leq \delta+\Delta) \qquad (17)$$

Because of this assumption, the delay of a pipeline stage, as measured by the delay from input request to output request, is still set to either $\delta$ or to $\delta+\Delta$. The difference is that the assertion of the extend signal from the BDARC controller that causes this extension can arise when the combinational delay of two stages back is larger than its nominal delay $\delta$.

The advantage of this approach is that the timing requirement $\Delta \leq 2\delta$ is more relaxed than the original requirement that $\Delta \leq \delta$. In particular, it offers significantly more flexibility in design because it allows the nominal delay of a pipeline stage $\delta$ to be as little as ⅓ of the worst-case delay $\delta+\Delta$.

The new controller specification can be derived from the existing controller specifications found above by extending the control mechanisms to implement the slightly more complicated version of the speculative handshaking protocol.

--Case Study: Plasma 3-Stage CPU
-- --Automatic Translation to BDARC Template

Figure 16:
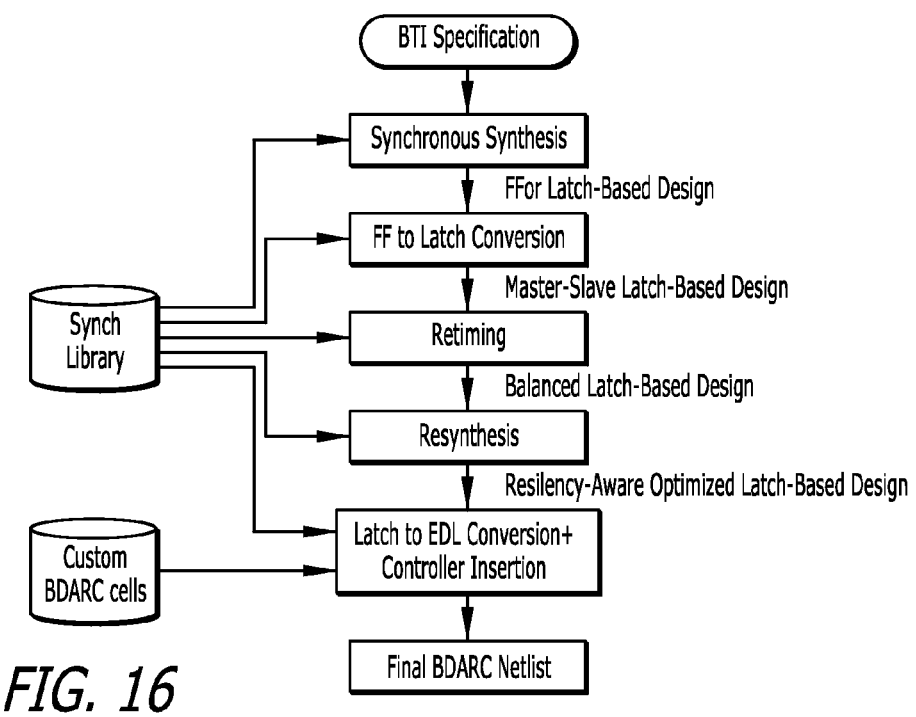
FIG. 16 illustrates a design flow for BDARC illustrating steps in the flow, as well intermediate results that may be obtained from each step.

An automated, computerized flow to convert single CLK domain synchronous RTL designs to BDARC using industry standard tools, including DesignCompiler and PrimeTime from Synopsys (for synthesis and STA) and NC-Sim from Cadence (for simulation), was developed to analyze the benefits of the proposed template on a 3-stage version of Plasma, *Plasma* CPU, 2014, Available: http://opencores.org/project, plasma, a MIPS OpenCore CPU, targeting a 28 nm FD-SOI technology. The computer program consists of various Tcl and shell scripts, a library of custom cells, and a Verilog co-simulation environment for verification and analysis that are wrapped in a Makefile system, which provides multiple configuration knobs to control the synthesized frequency, TRW, compensation for overheads, and other aspects of the design. The flow has 5 main steps, as shown in FIG. 16 and described below:

1) Synchronous Synthesis: The synchronous RTL is synthesized to a flip-flop (FF) based design at a given clock frequency with preset I/O delays and output load values.

2) FF to Latch Conversion: The FFs are converted to master-slave latches by synthesizing the design using a fake library of standardized D-Flip Flops (DFFs) that can be easily mapped to standard-cell latches.

3) Latch Retiming: The latch-based netlist is then retimed using a target TRW. The latches added during the previous step are redistributed through the combinational logic. This enables hiding backward latency due to the control overhead by spreading the original logic delays across latch stages. Additionally, time borrowing can be enabled on non-EDL stages to reduce the area impact due to retiming, where the allowable amount of time borrowing is bounded by the difference between the original clock period and the target TRW. In any case, the combined path delay constraint of two subsequent latch stages equals the original clock period.

4) Resynthesis: The retimed netlist is then resynthesized to optimize the expected area and performance of the final resilient netlist, as will be described below in the section Resynthisis.

5) BDARC Conversion: The resynthesized latch-based netlist is then converted to the BDARC template by removing clock trees and replacing them with BDARC controllers. The control logic, delay lines, and error detection logic are also inserted to create a final BDARC netlist.

The final BDARC netlist is validated via co-simulation with the synchronous netlist from step 1 to verify correct operation and measure performance. In particular, to verify correct operation the stream of inputs is forked to both the synchronous and BDARC netlists and the stream of outputs is compared.

--Handling Macros

In many designs, there may be logic blocks that are either implemented using hard macros or would be problematic to convert to the BDARC template directly. Therefore, it may be beneficial to capture errors at the inputs to these cells and ensure the timing for the macro is satisfied at the ideal target clock frequency, i.e. the given clock period minus the TRW. Fortunately, an important advantage of asynchronous design is that one can optionally add new pipeline stages to the design without changing functionality. While these additional pipeline stages, which include EDLs, can be placed anywhere in the circuit, advantage may be taken of this feature by adding an error-detecting pipeline stage at the input of the macro controlled by a non-token-buffer pipeline controller. These controllers only pass tokens through the system; unlike token controllers, they do not generate tokens on reset. Therefore, the functional behavior of the design is unchanged. In synchronous designs, this might not be possible without major architectural modifications as adding a pipeline stage changes the functionality greatly.

As an example of this process, the Plasma CPU contains a 32 entry register file (RF) that can be implemented using a memory generator or synthesized directly as 32 flip-flops per register. It is not uncommon for either the input or output of the RF to be on a critical path in the CPU; however, it is often the case that the majority of this critical delay occurs outside of the macro boundary (e.g. an ALU's result being stored into the RF). With BDARC, if a near-critical path ends at the RF, all internal registers would need to be converted to EDLs, resulting in large area overheads. But we can exploit the fact that the decoding logic inside the RF macro is quick in comparison to the rest of the input path by adding a non-token BDARC stage on the data and address inputs to the RF. The same resiliency benefits may be achieved while reducing the number of EDLs drastically without changing the macro itself; for a 32-bit RF, only 37 EDLs are required when placed at the input (32 for data, 5 for address) instead of 1024 when the internal flops are converted to EDLs. The nominal datapath delay from the added error detecting BDARC stage, through the RF, and to the subsequent BDARC stage must be faster than the ideal target frequency for this method to be effective, which was easily met in this case.

--Resynthesis

Each EDL may add overhead in timing and area in multiple ways: i) the EDL itself is larger than a latch; ii) the number of C-elements and Q-Flops increase; iii) the size of the OR/AND trees needed to combine error signals also increases; iv) and other areas depending on specific implementation. Therefore, it may be desirable to minimize the number of EDLs while maintaining both the robustness to timing violations and the expected performance increases. One optional method to achieve these goals is through resynthesis. The retiming step of the BDARC design flow generates a report of latches that should be converted to EDLs, i.e. all latches that are on a near-critical path, such that the static timing analysis indicates a timing violation would occur when running at the ideal target frequency. Constraining the delay to one of these latches to be no greater than the target frequency (or less) and resynthesizing the design would therefore remove the selected latch from the EDL report, allowing it to be implemented using a standard latch rather than an EDL. Although the combinational area may increase due to tighter constraints on certain paths, this overhead can be offset if multiple latches that were slated to become EDLs are no longer on near-critical paths as well. Unfortunately, the high degree of shared paths in the combinational logic makes it challenging to estimate the reduction in EDLs, i.e. constraining one latch may also speed up shared paths to many other latches. Moreover, the reduction of EDLs combined with faster combinational logic may lead to a reduced frequency of timing violations during simulation, which affects the maximum performance of the circuit.

Figure 17:
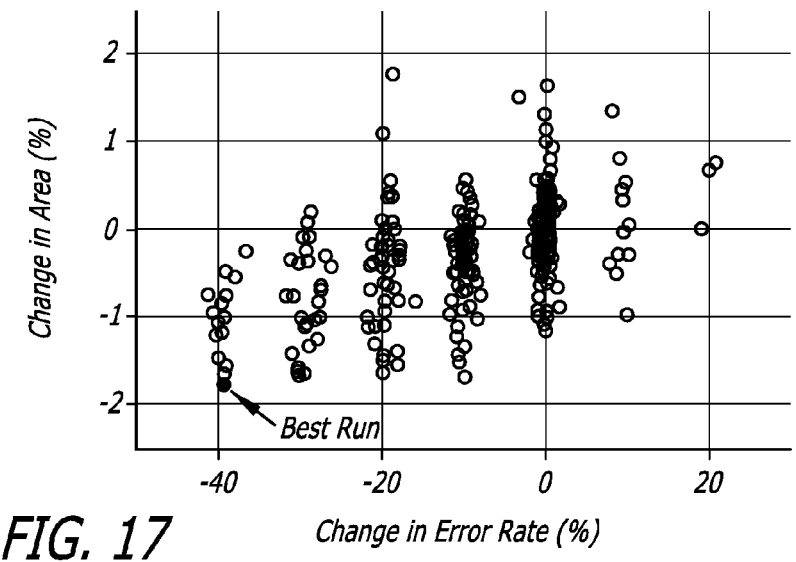
FIG. 17 illustrates results that may be obtained from resynthesis that illustrate resulting improvement in area and error rate for different resynthesis runs.

Without reliable methods of estimating these two effects, it is difficult to know a priori which latch(es) in the EDL report to further constrain; therefore, a brute-force approach in which all latches marked EDL are tested one by one is employed to find a suitable candidate latch. FIG. 17 shows the results of this approach on the Plasma CPU, with a given frequency of 666 MHz and a target frequency of 952 MHz. After retiming, there 456 latches required to be converted to EDLs. A max delay constraint equal to the target clock period was placed on each latch separately to ensure no timing violations would occur. Then the netlist was resynthesized, converted to BDARC, and simulated in the co-simulation environment to obtain both the post-conversion area and error rate, i.e. the frequency of timing violations averaged over the entire simulation. The best point, highlighted in red in FIG. 17, yields a 27% decrease in number of EDLs with a 1.79% decrease in overall area, and 39% improvement in error rate. Note that the potential benefits of this resynthesis approach will depend heavily on the initial starting frequency, i.e. a design that is already heavily constrained cannot easily be constrained further to achieve area and performance benefits.

--Area and Performance Comparisons

Figure 18:
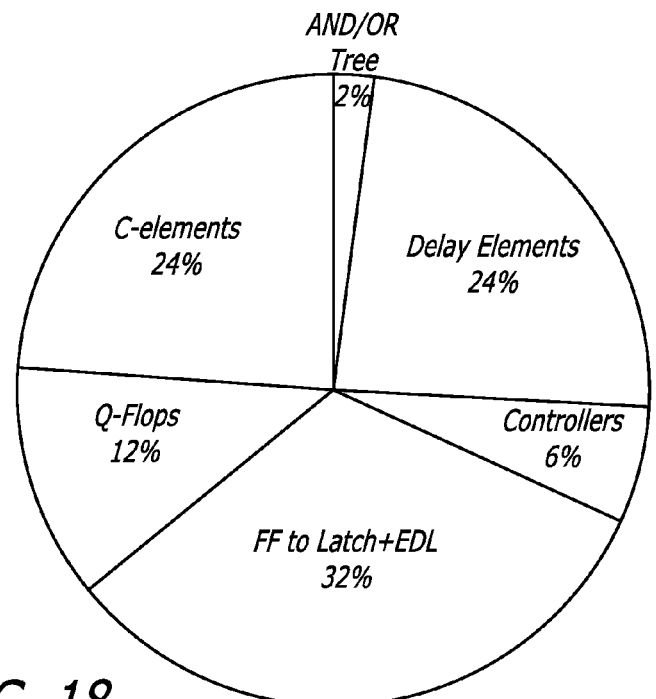
FIG. 18 illustrates area overheads of BDARC on a Plasma case study as a percentage of total overhead.

Using the flow described in the Automated Translation to BDARC Template section above, Plasma was converted from a 666 MHz synchronous flop-based design to BDARC with a timing resiliency window of 30% in a 28 nm FDSOI process. New library cells were created and characterized for the EDLs, C-elements, and Q-Flops to obtain accurate area and timing information for the synthesis tools and our simulations. While a behavioral model of the burst-mode BDARC controller, described in the BDARC Controllers section above, was used for simulation, a preliminary gate-level design was also mapped to the technology to estimate controller area and timing. The timing information generated through synthesis was then used to inform delays in the behavioral controllers and delay lines. The final asynchronous control logic and error detection overheads are depicted in FIG. 18. The overall area overhead from the original synchronous design is 8.4% after one pass of the resynthesis method presented above.

Figure 19:
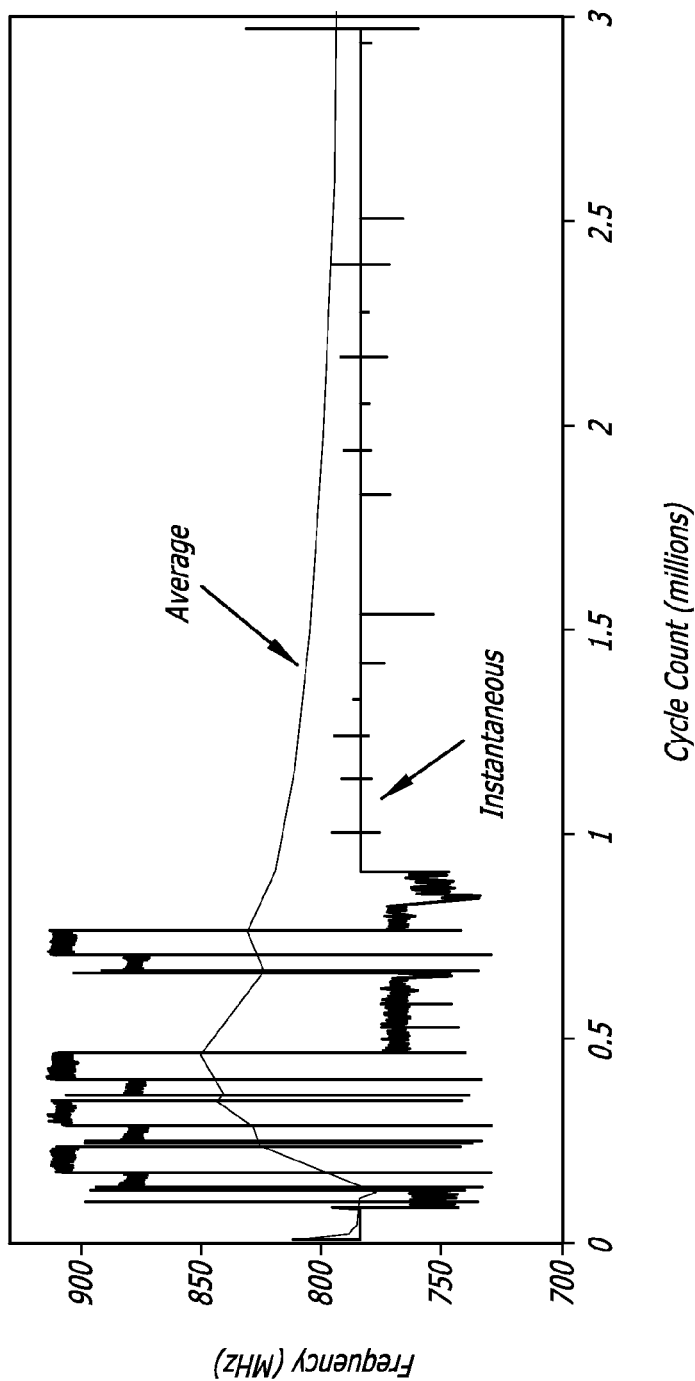
FIG. 19 illustrates average case performance over time for Plasma CPU using BDARC with an original synchronous frequency of 666 MHz.

To compare the performance between the synchronous and asynchronous designs, one iteration of an industry standard benchmark, CoreMark, was executed on both CPUs. The BDARC design achieved an average frequency of 793 MHz with a peak frequency of 950 MHz, an increase of 19% and 42%, respectively. A plot of the performance over time is shown in FIG. 19, where average performance is measured across the entire benchmark while the instantaneous performance is measured only over the previous 1,000 cycles. The BDARC design quickly switches operating frequencies, benefiting from large variations in data dependent delays near the beginning of the benchmark before the overall performance averages to just under 800 MHz.

--Execution Time

The proposed flow, excluding the resynthesis step, can be completed for the chosen design of roughly 20,000 gates in less than 3 hours on a reasonably modern computer system. The resynthesis step is performed in a "brute-force" manner, which may involve hundreds of individual synthesis steps each requiring no more than 3 hours of execution time. Therefore, the sequential approximation of total runtime may be roughly a few weeks of compute time. This execution time can be reduced significantly by parallelizing the work in the resynthesis step, resulting in no more than 48 hours of runtime on a reasonably modern computer system. By comparison, a manual, human implementation of these steps may take years to complete.

--Discussion

-- --Retiming

The retiming step of the BDARC conversion flow may reduce the performance of BDARC and increase area overhead of the final netlist. This opens the door to optimization problems that involve retiming to maximize average case performance. For example, a traditional synchronous retiming algorithm may prefer unbalanced paths between time-borrowing latches in order to save area without sacrificing performance. However, the final placement of the latches also affects the number of near-critical paths in the circuit. For resilient designs, poor latch placement could unnecessarily inflate the number of EDLs, resulting not only in larger area overheads but also higher error rates and lower performance.

-- --Performance with Margins

Because BDARC may have programmable delay lines, it is expected that, after tuning, these delays will reasonably track the delay of datapath combinational logic even in the presence of variations due to process and environmental factors, J. Tschanz et al., "*Tunable Replica Circuits and Adaptive Voltage-Frequency Techniques for Dynamic Voltage, Temperature, and Aging Variation Tolerance*," in *VLSI*, 2009, pp. 112-113. Therefore, the amount of margin required in the timing assumptions can be reduced compared to traditional synchronous designs. The δ delay line impacts the start of the timing resiliency window, and thus may lead to fluctuations in expected error rate under variation, but timing violations will still be identified and corrected. Accordingly, the majority of margin can be added to the Δ delay line, which controls the clock pulse width and delay penalty when a timing violation occurs. In simulations with Plasma, the average frequency of timing violations were 20%-40% in the benchmarks we considered. Thus, the impact of the added margin is only experienced 20-40% of the time, greatly reducing the percentage drop in performance compared to synchronous designs. This is in contrast to non-resilient bundled-data designs (e.g., J. Cortadella, A. Kondratyev, L. Lavagno, and C. Sotiriou, "*Desynchronization: Synthesis of Asynchronous Circuits from Synchronous Specifications,*" *IEEE Trans. on CAD*, vol. 25, no. 10, pp. 1904-1921, October 2006.) in which the added margin affects performance 100% of the time. As an example, a 10% increase in variation due to PVT can result in up to 30% margin penalty for synchronous designs; however, the performance impact on BDARC is less than 13%, when considering even a 40% rate of timing violations.

CONCLUSIONS

A bundled-data asynchronous resilient circuit template has now been described, including an example implementation of the template on a small CPU that achieves modest performance improvements due to variations in data dependency alone. When combined with expected variation due to PVT, the performance benefits can be significant, at the cost of a less than 10% increase in area. The BDARC template excels compared to other synchronous resiliency schemes and previous asynchronous approaches in the following key ways:

Some synchronous resiliency approaches either do not handle metastability or handle it unsafely. For example, Razor has no protection from metastability, which RazorII fixes at the cost of adding synchronizers in the control path, S. Das, C. Tokunaga, S. Pant, W.-H. Ma, S. Kalaiselvan, K. Lai, D. Bull, and D. Blaauw, "*RazorII: In situ Error Detection and Correction for PVT and SER Tolerance,*" *IEEE JSCC*, vol. 44, no. 1, pp. 32-48, January 2009. Likewise, Bubble razor fails to account for metastability, which leads to poor MTBF, S. Beer, M. Cannizzaro, J. Cortadella, R. Ginosar, and L. Lavagno, "*Metastability in Better-Than-Worst-Case Designs,*" in *ASYNC,* 2014, pp. 101-102. On the other hand, the metastability filter in the Q-Flop of the example BDARC stage guarantees correct operation of the circuit under metastability at the expense of performance. The stage will stall indefinitely until metastability has resolved, which is simply not possible in synchronous designs.

As was shown in Handling Macros section above, adding pipeline stages in an asynchronous design is straightforward and requires no architectural modifications to the original RTL. This allows enormous freedom in how the impact of difficult to handle timing paths can be mitigated. In the Plasma case study, adding a pipeline stage to the input to the RF reduced the area overhead in EDLs alone by ~67%.

Power characterization for BDARC designs and improvements that can be obtained via voltage scaling may be explored. Because the template allows performance improvements when compared to synchronous designs, designers can trade-off these improvements with power savings through voltage scaling, achieving lower power at iso-throughput.

Furthermore, BDARC also motivates new areas of work, including avenues for optimization for the average-case at the logic and architectural levels as well as new challenges in the area of automated physical design to realize these benefits post-layout. In addition, new testing strategies could be developed to both optimally tune the programmable delay lines based on in situ error rate monitoring and identify chips with delay variations too large to correct.

The various data processing functions that have been described may be implemented with a computer system configured to perform the functions that have been described. The computer system may include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include one or more computers at the same or different locations. When at different locations, the computers may be configured to communicate with one another through a wired and/or wireless network communication system.

The computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Figure 6:
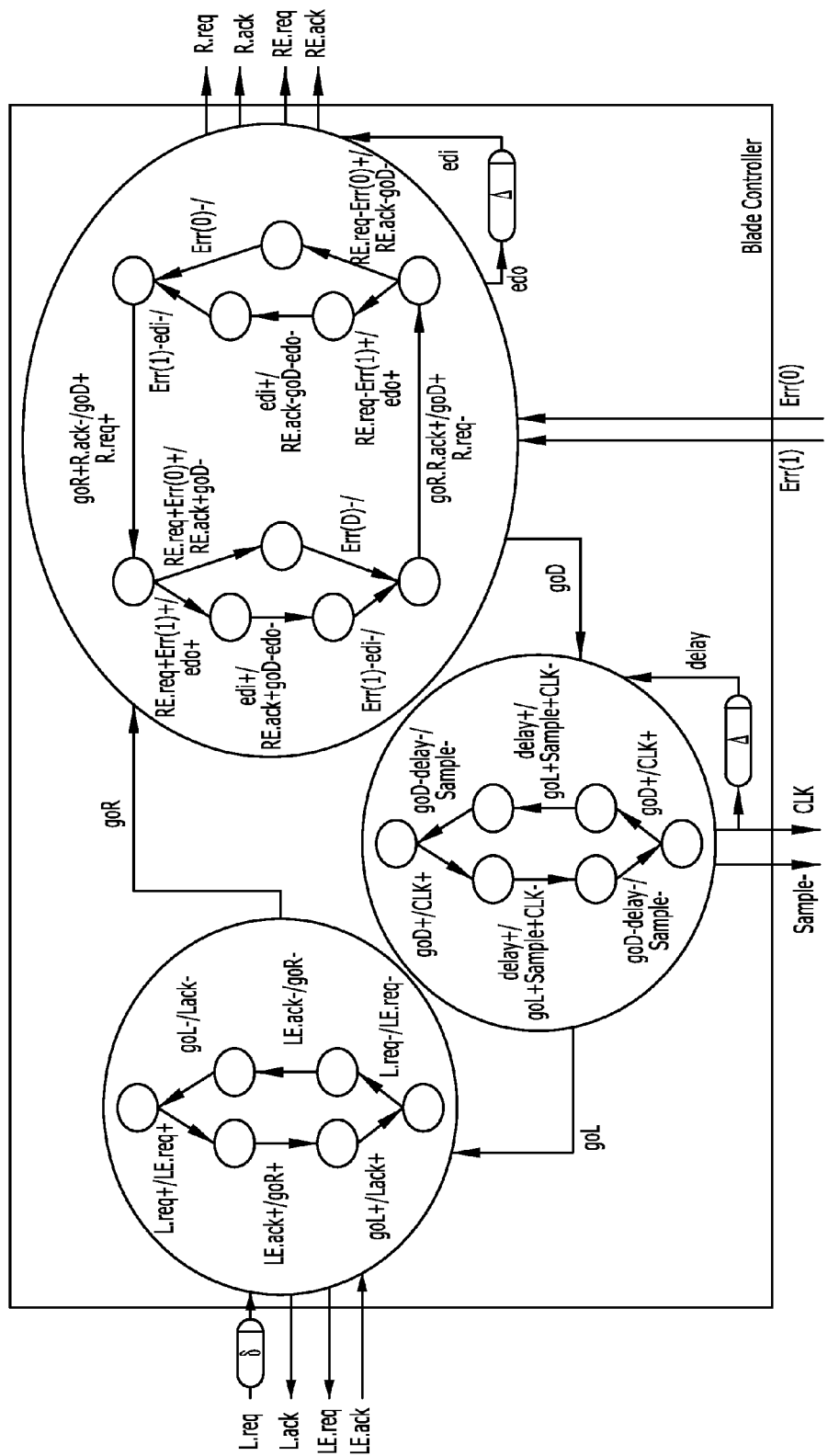
FIG. 6 illustrates one set of burst-mode state machines that can implement the BDARC controller with error detection.

For example, the asynchronous control circuits shown in FIG. 6 and FIG. 7 can also be specified in other asynchronous design languages, including handshaking expansions. The template shown in FIG. 2 could be configured in numerous ways using different components, including but not limited to regular latches plus transition detectors instead of EDLs and analog delay elements instead of delay lines. In addition, the combinational logic datapath may be placed on either side of the latches or both. The error detection logic shown in FIG. 3 may also be implemented using a variety of components, such as samplers instead of Q-Flops and any combination of Boolean gates to combine error signals, e.g.

NOR, NAND, AND, and OR gates. In addition, in the design flow for BDARC circuits shown in FIG. 16, it may be possible to instantiate the asynchronous controllers prior to retiming the latches and resynthesis. Also, although illustrated in a linear pipeline in FIG. 14, BDARC circuits may be configured in more complex forms that include fork-join pipelines and cycles as well as stages that exhibit conditional communication, such as SEND and RECV cells.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An asynchronous circuit comprising:
   a single-rail logic datapath;
   one or more error-detecting latches;
   a controller that controls the error-detecting latches; and
   delay lines,
   wherein the controller and the delay lines cooperate to communicate with one or more other controllers that the output of the controlled error-detecting latches may be valid and that this communication occurs prior to when the error-detecting latches indicate whether or not an error occurred.

2. The asynchronous circuit of claim 1 where at least one of the delay lines have a programmable delay amount.

3. The asynchronous circuit of claim 1 wherein one or more of the delay lines control a nominal delay between when latches of different connected controllers become transparent.

4. The asynchronous circuit of claim 3 wherein the controller, upon one or more error detecting latches determining an error occurred, cooperates with the one or more delay lines to extend the nominal delay between when latches of different connected controllers become transparent.

5. The asynchronous circuit of claim 1 wherein one or more of the delay lines control a nominal time period during which the latches controlled by the controller are transparent.

6. The asynchronous circuit of claim 5 wherein the controller, upon one or more error detecting latches determining an error occurred, cooperates with the one or more delay lines to extend the nominal time period during which the latches that are controlled by the controller are transparent.

7. The asynchronous circuit of claim 1 wherein the one or more delay lines control:
   a nominal delay between when latches of different connected controllers become transparent; and
   a nominal time period during which the latches controlled by the controller are transparent.

8. The asynchronous circuit of claim 1 wherein the controller, upon one or more error detecting latches determining an error occurred, cooperates with the one or more delay lines to extend:
   the nominal delay between when latches of different connected controllers become transparent; and
   the nominal time period during which the latches that are controlled by the controller are transparent.

9. The asynchronous circuit of claim 1 further comprising one or more components that prevent metastability at the output of the error-detecting latches from propagating to one or more other components of the circuit and generate a signal indicating that the metastability has been resolved.

10. The asynchronous circuit of claim 9 wherein the controller delays a communication with the one or more connected controllers until the metastability is resolved.

11. The asynchronous circuit of claim 1 further comprising one or more time borrowing latches and wherein the controller also controls the one or more time borrowing latches.

* * * * *